US012445318B2

(12) United States Patent
Rössl

(10) Patent No.: US 12,445,318 B2
(45) Date of Patent: Oct. 14, 2025

(54) BUS SYSTEM AND SUPPORT DEVICE COMPRISING SUCH A BUS SYSTEM

(71) Applicant: VusionGroup GmbH, Fernitz-Mellach (AT)

(72) Inventor: Andreas Rössl, Fernitz-Mellach (AT)

(73) Assignee: VusionGroup GmbH, Fernitz-Mellach (AT)

(*) Notice: Subject to any disclaimer, the term of this patent is extended or adjusted under 35 U.S.C. 154(b) by 64 days.

(21) Appl. No.: 18/549,542

(22) PCT Filed: Mar. 9, 2021

(86) PCT No.: PCT/EP2021/055916
§ 371 (c)(1),
(2) Date: Sep. 7, 2023

(87) PCT Pub. No.: WO2022/188956
PCT Pub. Date: Sep. 15, 2022

(65) Prior Publication Data
US 2024/0297803 A1 Sep. 5, 2024

(51) Int. Cl.
H04L 12/10 (2006.01)
(52) U.S. Cl.
CPC ................... H04L 12/10 (2013.01)
(58) Field of Classification Search
CPC .......................................... H04L 12/10
USPC .......................................... 375/257
See application file for complete search history.

(56) References Cited

U.S. PATENT DOCUMENTS

| 5,461,561 A | 10/1995 | Ackerman et al. |
| 6,249,263 B1 | 6/2001 | Kayser et al. |
| 2013/0275779 A1* | 10/2013 | He ............... G06F 1/26 713/300 |

FOREIGN PATENT DOCUMENTS

| DE | 102014224562 | 3/2016 | |
| DE | 102014224642 B3 * | 3/2016 | ............ H04L 12/10 |
| JP | 2004-503847 A | 2/2004 | |

OTHER PUBLICATIONS

An Examination Report mailed by the Australian Patent Office on Nov. 4, 2024, which corresponds to Australian Patent Application 2021432821 and is related to U.S. Appl. No. 18/549,542.
An Office Action; "Notice of Reasons for Refusal," mailed by the Japanese Patent Office on Sep. 4, 2024, which corresponds to Japanese Patent Application No. 2023-545238 and is related to U.S. Appl. No. 18/549,542.

(Continued)

Primary Examiner — Kevin M Burd
(74) Attorney, Agent, or Firm — Studebaker Brackett PLLC

(57) ABSTRACT

A bus system, a shelf edge strip bus system in particular, which comprises a first line for determining an electric reference potential, a second line for providing a supply voltage with a desired value in relation to the reference potential, at least one third line, preferably a single third line, for communication of signals and/or data, a supply device, which is electrically conductively connected to the lines and is designed for electric power supply as well as for communication supply of electronic devices which can be connected to the bus system, wherein the supply device is designed to supply different device types both with electric power and with communication, particularly in a device-type-specific manner.

27 Claims, 8 Drawing Sheets

(56) References Cited

OTHER PUBLICATIONS

An Examination Report mailed by the Australian Patent Office on Aug. 20, 2024, which corresponds to Australian Patent Application 2021432821 and is related to U.S. Appl. No. 18/549,542.
Notification pursuant to Article 94(3) EPC issued by the European Patent Office on May 30, 2025, which corresponds to European Patent Application No. 21712730.7-1206 and is related to U.S. Appl. No. 18/549,542.

* cited by examiner

BUS SYSTEM AND SUPPORT DEVICE COMPRISING SUCH A BUS SYSTEM

CROSS-REFERENCE TO RELATED APPLICATIONS

This is a 35 U.S.C. 371 National Stage Patent Application of International Application No. PCT/EP2021/055916, filed Mar. 9, 2021 which is hereby incorporated by reference in its entirety.

TECHNICAL FIELD

The invention relates to a bus system comprising lines and a supply device for supplying devices with electric power and for the communication supply of these devices, bus-system compatible devices and a support device comprising such a bus system.

BACKGROUND

WO 2017/153481 A1 discloses a support device in the form of a shelf edge strip (sometimes termed shelf rail), which comprises a base support which is designed for mechanically fastening an electronic display unit. The base support delimits an accommodating region for accommodating the display unit, comprising three side walls, which are arranged in a U-shape. Thus, the accommodating region is delimited on three sides here and the display unit can be inserted into the shelf edge strip or removed therefrom from the front, via the side of the U shape which is left open.

A first, central side wall is formed by a plate. This plate is used as a reference or positioning plane, on which the rear wall of the display unit can be positioned on the shelf edge strip. The plate comprises openings, which are arranged in a grid. These openings are used for contacting electrical conductor tracks by means of contact pins of the display unit, in order to supply the display unit electrically. The conductor tracks are arranged on a conductor support, which is positioned on the side of the first side wall which faces away from the accommodating region.

The support device also comprises a supply device, which supplies the display unit both in terms of communication and with electric power. The supply device is electrically conductively connected to the conductor tracks, carries the batteries required for battery operation and is arranged behind the conductor support. A bus system for this support device is formed here by the combination of supply device and conductor tracks.

This bus system is designed exclusively for operation with a single type of device, namely the display units, which comprise screens with an extremely low energy requirement, which is enabled for example by the use of "electronic ink" technology.

Against this background, the object of the invention is to provide an improved bus system.

SUMMARY OF THE INVENTION

This object is achieved by a bus system, a shelf edge strip bus system in particular, which comprises: a first line for determining an electric reference potential, a second line for providing a supply voltage with a desired value in relation to the reference potential, at least one third line, preferably a single third line, for communication of signals and/or data, and a supply device, which is electrically conductively connected to the lines and is designed for electric power supply as well as for communication supply of electronic devices which can be connected to the bus system, wherein the supply device is designed to supply different device types both with electric power and, following the identification thereof, with communication in a device-type-specific manner.

Furthermore, this object is achieved by an electronic device, which device comprises a bus interface, which is designed for connection to lines of a bus system, wherein the bus system comprises: a first line for determining an electric reference potential, a second line for providing a supply voltage in relation to the reference potential, at least one third line, preferably a single third line, for communication of signals and/or data, and a supply device, which is electrically conductively connected to the lines and is designed for electric power supply as well as for communication supply of electronic devices which can be connected to the bus system, wherein the device is designed for the identification of the device with respect to the supply device for the purpose of subsequent device-type-specific communication with the supply device.

Furthermore, this object is achieved by a support device, preferably a shelf edge strip, which comprises a bus system according to the invention.

The measures according to the invention are associated with the advantage that, in a departure from the known bus system, devices of a very wide range of types can now be operated on the support device. This allows a substantially more flexible equipment of the support device with devices, which may differ with regards to their type (that is to say e.g. due to the device class), such as e.g. electronic display units, sensor units, input units or else image-capturing units, etc., thus the functionality of the support device can de facto be extended as desired or else adapted to individual requirements.

Devices of a very wide range of types may however also exist within a device class, such as e.g. the device class electronic display units. These display units may differ with regards to their type due to the screen diagonal or else due to the number of pixels or the range of colours that can be displayed or else due to the technology used (electrophoretic, OLED or LCD, etc.), etc. The situation is similar for the device class of the image-capturing units. These image-capturing units may differ with regards to the type of the result of their image capture, namely still image or video stream or else with regards to the resolution or else the spectral range, etc. All these differences within a device class may make a device-type-specific activation or communication necessary, in order to be able to use the very wide range of functionalities optimally.

The usability of devices of different types is actually achieved by means of two measures, which mesh with one another.

The first measure stems from the supply device being designed to communicate with different device types, particularly in a device-type-specific manner. This may be realized by storing communication parameterizations, such as communication protocols and/or instruction sets, for different device types, which parameterizations can be retrieved or used in a flexible manner. In this case, these communication parametrizations may e.g. be saved in the supply device in advance or may be retrievable by the supply device as required from a device management server. This communication parameterization could also be provided directly by the relevant electronic device. It may also be provided that the provision of supply voltage or the supply power is adapted by the supply device in a device-type-specific manner.

The second measure stems from each device being designed for its identification with respect to the supply device, particularly across device types or independently of device type, before the device can be used for device-type-specific communication with the supply device; this is also discussed in detail in the following, particularly in connection with the acquisition of identification data by the supply device and the delivery of the identification data by the electronic device. During this device-type-independent identification, the said identification data are transmitted, which subsequently allow a device-type-specific communication between the supply device and the respective device.

Further particularly advantageous embodiments and developments of the invention result from the dependent claims and also the following description.

Details of the setup of the communication as well as the communication handling in the bus system are discussed in the following.

One of these aspects relates to the introduction of a change of an operating state or mode. It has proven advantageous here that the supply device is designed for a temporary change of the supply voltage, in order to introduce a change of an operating mode. On the part of the electronic device, it is provided that the device comprises a detection stage, which is designed for detecting a temporary change of the supply voltage, and that the device is designed to change its operating mode in the event of such a detection.

These measures are associated with the advantage that, in contrast to known bus systems, the signalling of a change of the operating mode no longer necessarily has to take place by means of separate signal or data lines which are specially provided therefor. Rather, the line provided for the electric power supply is used, without using the at least one third line, which is provided for the signal and/or data communication. Therefore, it is also not necessary that the devices connected to the bus are in a synchronous state with the supply device at the time of the introduction of the change of the operating state. Rather, each device may be in any desired, device-specific operating mode, such as a sleep or idle mode with low to essentially no power consumption or else a processing or active mode, in which an autonomous processing of information, signals and/or data takes place in the device. The same also applies otherwise for the supply device. That a change of an operating mode is now being introduced or at least has already been introduced on the part of the supply device is signalled or communicated by the supply device to the electronic devices connected to the bus system with the aid of a temporary change of the supply voltage and is detected and, if appropriate, also implemented there.

In this case, the change of an operating mode may exclusively be a change of the supply device operating mode. In this case, this supply device operating mode change is simply only shared with the other devices, in order to inform the devices of this. The thus-informed devices can remain in their own operating mode pattern and in principle in no way have to react or show a reaction outwardly.

The change of an operating mode may however also be a change of a device operating mode, which is sought by the supply device and is to be introduced at the devices e.g. in a manner unaffected by the respective currently present supply device operating mode. In this case, the requirement of device operating mode change is shared with the devices, detected and also implemented there.

The change of an operating mode may however also be a collective change of the supply device operating mode and the device operating mode. In this case, the requirement of a change of the operating mode with bus-system-wide validity as it were is signalled or communicated and all of the devices connected to the bus system follow this request by the supply device and introduce the change of their device operating mode, in order e.g. to be consistent with the supply device operating mode, which is likewise introduced. This can also be understood as a synchronization of the currently present device-specific operating modes between the supply device and the devices connected to the bus system.

This measure supports the flexibility of the bus system to operate and to activate an almost arbitrary range of different devices or device types using the bus system, specifically primarily without the absolute necessity of having to take account of special communication protocols or functional characteristics of the individual devices. In stark contrast to known measures, in which an operating mode change must be communicated by means of data communication according to a communication protocol adapted to the devices which are connected to the bus system, the invention makes use of those lines of the bus system which are conventionally only provided for the electrical supply, and indicates to the devices, which are connected to the bus system, by means of a temporary change of the supply voltage, that an operating mode change is to be introduced.

This also allows, for the first time, the use of devices at the bus system, which can be designed electronically (in terms of circuitry) such that the devices are decoupled or separate from the at least one third line, wherein the devices are, in spite of this, supplied with electric power via the first and the second line. In spite of the decoupling from the at least one third line, the devices which are connected to the bus system remain reachable for the supply device in terms of communication or signal technology and the devices can be supplied with "basic information", such as in the current context, the control information, that a change of the operating mode is to be introduced.

The multiplicity of different devices, which has already been mentioned previously, may, without claiming an exhaustive list, comprise a basic functionality or basic design: Sensors, such as e.g. temperature sensors or proximity sensors, etc., cameras for still image capture or video capture or infrared capture; input devices such as e.g. individual keys or keypads or rotary knobs or rotary controls or else touchscreens; display units, such as e.g. one or more light-emitting diodes (LEDs), video screens or else electronic shelf displays with energy-saving bistable screen technologies, such as e.g. electronic ink or e-paper or active screen technologies, such as e.g. liquid crystal display (LCD) or organic light-emitting diodes (OLEDs), etc.

All of these different devices are designed in a manner compatible with the bus system of the support device, in order to be connected to the bus system and used there.

The aforementioned devices therefore essentially have a basic functionality. Such devices may however also have combined basic functionalities or provide a dominant basic functionality which is extended by further supporting functions. Thus, these devices may also provide further, supplementary communication functionalities, such as e.g. an NFC interface for device activation, for data transmission from and to the device or else control of functions of the device from the direct vicinity (a few millimetres to a few centimetres) or else for producing a link between a product and the electronic device or a Bluetooth low-energy radio module for wireless communication over wider distances with compatible devices.

Each of these devices comprises device electronics, which can be divided structurally as well as functionally into different circuit blocks. Thus, the device electronics may comprise at least one circuit block for the respective basic functionality, if appropriate also one circuit block for the additional functionality, one circuit block for the energy supply and at least one circuit block for coupling to the bus system, if appropriate separated into coupling to the at least one third line on the one hand and coupling to the second line on the other hand.

Different tasks or roles may be assigned to the supply device, depending on the context in which the bus system is used.

One of these roles consists in the fundamental task of the electrical supply of the devices connected to the bus system. For this purpose, the supply device itself can be electrically supplied with the aid of a local or central power supply unit or else supplied via radio, such as e.g. using power over WiFi technology. The supply device can also be connected to a (rechargeable) battery which is assigned to it, from which the supply device draws the electric power for its own operation as well as for the operation of the devices which are connected to the bus system.

A further role consists, with the aid of the supply voltage, in introducing a change of an operating mode. This may e.g. be necessary if the supply device is used as a shelf edge strip controller on a shelf edge strip which carries the lines, if a central management instance (e.g. a cloud service or a local server where a management software—also termed a superordinate "software entity"—is executed for managing electronic devices which are fastened to the shelf edge strip) must identify the individual devices on the shelf edge strip, retrieve the data of the individual devices or else activate or supply the individual devices with data. Here, the supply device may also, even already in advance of the actual communication with the central management instance, proactively carry out the detection of the devices installed on the shelf edge strip, store the thus-detected identification data and only deliver these identification data to the central management instance at a later time.

The cloud service is connected via the internet to a local LAN or WLAN infrastructure, wherein one or more access points provide the connection to the supply devices in this infrastructure.

The local server may also be connected to such access points via a LAN or WLAN infrastructure.

Each access point can be designed to communicate with the supply device via a wireless connection. In this case, a (de facto) standardized communication method (e.g. Zig-Bee®, Bluetooth® Low Energy, WLAN, etc.) or a proprietary communication method can be used. A proprietary communication method of this type is for example known from WO 2015/124197 A1, the disclosure of which is hereby included by reference. In contrast to WO 2015/124197 A1, the time slot communication method disclosed there is not used in the present case in the devices which are attached to the shelf edge strip, which devices are indeed connected to the supply device in a wired manner, but rather is used in the supply device for the communication with the access point. The systematic change—which is disclosed in WO 2015/124197 A1 in connection with the electronic display units (referred to as radio tags there)—between an extremely energy-saving sleep state and, in comparison thereto, an energy-consuming active state, in order on the one hand to ensure operation which is as energy-saving as possible and on the other hand to ensure synchronism with the access point, is implemented in the present case in the supply device.

Independently of the choice of wireless communication method, a group of supply devices can be assigned to an access point, which supplies them in terms of radio technology, wherein each supply device supplies the devices connected to its bus system in a wired manner. The respective supply device therefore forms an access or control node for the devices which are installed on its support device, such as e.g. its shelf edge strip.

In principle, it may be provided that the supply device always stays in its extremely energy-saving sleep state if there is no activity requirement.

The supply device also comprises supply device electronics, which can be divided into circuit blocks. Thus, a circuit block is also provided here for the electrical supply of the supply device. This may be a voltage regulator, such as e.g. a series regulator, particularly an LDO linear regulator (LDO stands for low dropout), which is connected to an internal or an external energy storage device, which outputs a voltage of 3.7 to 4.2 volts (such as e.g. a battery, a battery pack or a configuration of rechargeable battery cells), and generates an internal supply voltage of the supply device with approx. 3.3 volts.

A further circuit block may be a logic stage, which is realized in particular with a microcontroller and which is operated with the aid of the internal supply voltage. The microcontroller, if appropriate including its peripherals, provides the various functionalities of the supply device, which, with the exception of the hardware features, are realized with the aid of a software which is executed by the microcontroller, is stored in a memory of the microcontroller and, if appropriate, uses hardware features during its execution.

A further circuit block may be a stage for generating the (external) supply voltage for the second line of the bus system, wherein a step-up converter may for example be used for this, which is connected at the input side to the external energy storage device. At the output side, the step-up converter generates the bus system supply voltage with the defined desired value of e.g. 5 volts.

A further circuit block may be formed by a fault detection circuit, which is designed for detecting faults on the at least one third line and which is connected between the at least one third line and the send and receive pins of the microcontroller as well as an analogue/digital converter pin (ADC input) of the microcontroller. Using the ADC input, the microcontroller can also detect, possibly measure or evaluate the voltage present on the at least one third line. A further analogue/digital converter pin (ADC input) of the microcontroller may also be connected directly to the second line, so that the microcontroller can also detect, possibly measure or evaluate the voltage present on the at least one third line.

A further circuit block can be used for detecting an overload of the bus system, caused in particular on the at least one third line, and is configured such that when an overload is detected, the output of the step-up converter is disconnected from the second line.

A further circuit block may relate to the radio system, which is used for the radio traffic with the aforementioned access point. This circuit block may comprise an antenna configuration as well as a matching network. Likewise, a circuit is provided here for converting analogue signals received via radio into digital signals and vice versa. This circuit block is connected to the microcontroller, so that the microcontroller can, in radio traffic with the access point, receive data and for its part deliver data to be transmitted via radio signal.

Furthermore, a circuit block may be provided, which comprises a signalling unit which can be activated by the microcontroller, in the simplest case a single LED.

Furthermore, a circuit block may also be provided, which comprises an input unit which can be read by the microcontroller, in the simplest case a key.

A memory stage, in the present case for example a flash memory, which can also be addressed by the microcontroller via an e.g. serial peripheral interface (SPI for short), may also be provided as a further circuit block.

Also, when in the preceding text passages, the supply unit electronics and the device electronics were explained conceptually on the basis of circuit blocks, it may be noted at this point that the respective electronics may also be realized as e.g. an ASIC (application specific integrated circuit) or as a "system on a chip", so that the electronics may be divided less into discrete circuit blocks and rather into functional units of an integrated circuit.

The external energy storage device may be a conventional battery or a configuration of batteries or battery cells. However, it has proven particularly advantageous if the supply device is coupled to an external energy storage device for the purpose of electrically supplying the supply device, wherein the external energy storage device is particularly preferably a "smart energy storage device" and the supply device is designed to receive and to process information or data, which relates to the energy-storage-device type and/or the electrical storage capacity and/or the usage history and/or the energy supply status, from the external energy storage device via a data or signal line. The smart energy storage device may comprise an internal battery microcontroller, which can be connected via its communication interface, e.g. realized in accordance with the $I^2C$ or SMBUS (system management bus) specification, to the supply device electronics, which comprise a compatible communication interface, particularly to the logic stage thereof, e.g. via a cable. With the aid of the battery microcontroller, a very wide range of smart functions can be realized, which may e.g comprise the precise detection of the charging or consumption state as well as other information relating to the energy storage device, which may be communicated by the energy storage device to the supply device. The energy storage device can be integrated into the supply device. Preferably, however, it is arranged externally, as mentioned, so that it in the event of dwindling charge, it can be replaced by a charged energy storage device by means of simple unplugging from the supply device, specifically particularly such that the supply device as such does not have to be detached from the support device (e.g. the shelf edge strip).

Furthermore, it may be advantageous if the external (smart) energy storage device comprises a security element, which is preferably realized by a security chip, with the aid of which the external energy storage device can be authenticated with respect to the supply device. The associated advantages and effects are explained below in the text of the general description at the location where the electronic device, which can likewise be equipped with such a security element, is discussed.

The transmission of signals and/or data via the lines of the bus system may take place synchronously using at least one control line and one or more data lines. Depending on the implementation, a plurality of third lines are provided in this bus system. However, in a preferred embodiment, the at least one third line provided for the transmission of signals and/or data is actually only realized by a single third line. Thus, in this preferred embodiment, the bus system is a pure three-line system. Therefore, for reasons of easier readability, where appropriate, only a third line in the sense of a single third line is discussed in the following.

The three lines may be realized as flat conductor tracks, similar to those as are used in printed circuits and be applied on an e.g. "Pertinax plate", which is typical for such conductor tracks. Preferably, however, they are realized with wires which comprise a substantially circular cross section. In a preferred embodiment, these wires comprise no insulating layer. They are therefore bare and they are integrated into the surface of an insulating, that is to say non-conductive, plate, preferably a plastic plate, which is also termed a conductor support, where they can be contacted by the contacts of the devices.

The change of the supply voltage is discussed below. In principle, it would be sufficient that any change of the supply voltage, which can be detected on the device side, be used. For the detection thereof, the device comprises a detection stage, which is designed for detecting a temporary change of the supply voltage, wherein the device is designed to change its operating mode in the event of such a detection. However, in order to avoid the risk of false detections or else the risk of an undesired "reset" (hardware reset) of the devices connected to the system bus, it has proven advantageous if the supply device is designed to change the supply voltage in accordance with a predefined signal shape. Advantageously, the detection stage of the device is also designed for detecting the predefined signal shape of the supply voltage. This is associated with the advantage that the detection on the part of the device is facilitated, because the signal shape to be detected is already known. Therefore, on the part of the device, the detection stage can be designed in a targeted manner to detect the predefined signal shape of the supply voltage.

At this point, it may also be mentioned that there may also be different predefined signal shapes, in order e.g. to be able to address certain device groups, device models, device types or device classes or else individual devices in a targeted manner, without other devices, device models, device types or device classes or device groups having to react.

This may be implemented in different ways. Thus, the predefined first signal shape of the supply voltage can be defined by at least one parameter of the group listed below, namely: a) a falling edge, particularly with the defined curve of the falling edge, preferably with a value of the slope (voltage change per unit time) of the falling edge within a defined value range, particularly preferably with a defined voltage value difference, b) a rising edge, particularly with the defined curve of the rising edge, preferably with a value of the slope of the rising edge (voltage change per unit time) within a defined value range, particularly preferably with a defined voltage value difference, c) a voltage value which is present during a time period and which differs from the desired value of the supply voltage, preferably with a lower value than the value of the supply voltage, more preferably with a value corresponding to the digital low state, particularly preferably a value corresponding to the reference potential.

These variants are essentially to be considered as equivalent with regards to their signalling action, wherein the variants according to point c) proved easiest to implement and above all easiest to detect, however.

Thus, for example, the device may comprise a microcontroller and the detection stage may be realized with the aid of the microcontroller, wherein in the microcontroller, an interrupt input of the microcontroller is used in order to detect the predefined signal shape, wherein the interrupt input of the microcontroller is connected to or coupled with the second line and wherein the presence of the predefined signal shape triggers the interrupt of the microcontroller, which changes the operating mode of the device. As the interrupt input of the microcontroller is configured precisely such that it detects the signal shape according to point c), if appropriate with the matching steepness of edge for the interrupt input, as a trigger for the interrupt, no further measures are necessary for ensuring a reliable detection.

As mentioned, no reset should be triggered with the temporary change of the supply voltage for the purpose of introducing a change of an operating state. Therefore, it has proven advantageous that not only the signal shape is predefined, but rather also the duration thereof in particular. According to this aspect, the temporary change of the supply voltage, particularly the duration between the start of the change and the restoration of the supply voltage with the desired value with respect to the reference potential of the supply voltage, lasts less than 500 µs, preferably less than 250 µs, particularly preferably in the order of magnitude of 100 µs.

On the device side, this aspect is taken into account as follows. The device comprises a second voltage generating device, which is configured for receiving the supply voltage via the second line of the bus system and which is configured to generate a device-internal device supply voltage using this supply voltage. The relatively short duration of the change of the supply voltage can than be taken into account by simple measures on the side of the device, in order to prevent the undesired triggering of a reset, caused by a supply voltage interruption. Taking this into account may appear such in terms of circuit engineering, that the second voltage supply device is protected on the input side with a buffer capacitor against the temporary change of the supply voltage. The buffer capacitor is for its part protected against a discharge of the buffer capacitor towards the second line using a diode, which is provided for direct connection to the second line for the purpose of supplying the supply voltage and is forward biased towards the capacitor. The buffer capacitor is dimensioned such that sufficient electrical energy can be stored in it, in order to ensure the device-internal energy supply during the duration of the change of the supply voltage.

For the purpose of generating the change of the supply voltage, the supply device can be configured such that the supply device comprises a first voltage generating stage, which is designed for generating the supply voltage with the desired value and for delivering the supply voltage at its output, and comprises a switching stage, which can be activated by means of a control signal and which is designed, depending on the control signal, alternately either to connect the second line to the first line or the second line to the output of the voltage generating stage, and that one of the outputs of the microcontroller of the supply device is connected to the switching stage and the microcontroller is configured for delivering the control signal to the switching stage. The microcontroller therefore controls the switching stage, which is realized with the aid of MOS-FET transistors, in a digital manner.

Here, it has proven particularly advantageous that the switching stage is designed in two parts. A first switching stage part is provided for interrupting the power supply via the second line of the bus system. A second switching stage part is provided for the actual connection of the second line to the reference potential. During operation, initially, the first switching stage becomes active and the power supply is interrupted a few microseconds in advance of the second switching stage becoming active, in order to prevent a short circuit. With the completion of the temporary change of the supply voltage, the deactivation of the two switching stages takes place in reverse order.

The operating modes and the change thereof are discussed below. The aspects which are explained here by way of example are used above all for detecting devices which are connected to the bus system and with which communication is to be handled subsequently.

According to one aspect of the invention, the supply device comprises a detection mode, in which the supply device is designed for detecting identification data, which uniquely identify an electronic device which is connected to the bus system, of one or more electronic devices which are connected to the lines. In order to start this detection on the part of the supply device, that is to say to change its operating mode to that effect, the supply device is designed to assume the detection mode before or as soon as it effects the change of the supply voltage. Excepting special cases, each device which is connected to the bus system and should be addressable individually on the bus system comprises identification data and is designed for assuming an identification mode, in which the device is configured for delivering the identification data via the at least one third line. The device is additionally designed, for the purpose of changing its operating mode, to assume the identification mode and, when a change of the supply voltage is determined, to change its operating mode to the effect that it assumes the identification mode.

As the supply device does not yet have to be informed about the number of devices connected to the bus system when the detection mode starts, it has proven particularly advantageous that the supply device is configured to remain in the detection mode and to receive identification data until no further identification data are received. Since, as mentioned, an unknown number of the devices may be connected to the bus system and all enter into the identification mode at the same time, a process or method is implemented in the devices, which allows the devices, in spite of competing intrusion on the bus system, to reliably and completely transmit their identification data. In detail, in the identification mode, each device is configured to deliver its identification data, if appropriate also to repeat the delivery (if appropriate at least of parts of the identification data), until it has been possible to deliver the identification data completely without interference. In particular, each device in the identification mode comprises an open drain connection to the at least one third line for delivering the identification data. This is realized for the transmission output of the device. In the identification mode, all of the devices on the bus system which are connected to the third line are connected to one another in parallel using this special output configuration. Therefore, it is determined that in the event of competing transmission of different information units (bits), the logical state or the signal level state "low" or the logical symbol "0" dominates with respect to the logical state or the signal level state "high" or the logical symbol "1". In order to then determine in a device that it itself is attempting to transmit a logical "1", whilst a different device is transmitting a logical "0", the devices in identification mode are designed for simultaneous monitoring on the third line whilst they transmit their data. Therefore, each device in the identification mode is configured to check, at the same time as the delivery of the identification data, whether the signal sequence occurring on the at least one third line corresponds to the sequence of the logical states which are defined by the own identification data, and as soon as a deviation between the current signal state of the at least one third line and the current logical state of the own identification data occurs, to abort the delivery of the identification data and only then to restart again when the at least one third line is detected as free for the renewed dispatches of the own identification data. This can be given by time sequence, signal level or command receipt. In other words, this means that each device which determines that its attempt to transmit a logical "1" was "overruled" by a different device, by means of the transmission of a logical "0", interrupts the transmission of its identification data. The other device or else the other devices, which are transmitting the dominant "0" at the same time and detect this state on the third line by means of the aforementioned simultaneous monitoring continue their transmission of the identification data until ultimately all devices with the exception of a single one have cancelled their transmission, as each device is identified by unique identification data. After the identification data of the single remaining device have been transmitted to the supply device and stored there, all remaining devices begin anew the competing transmission of their individual identification data, in order ultimately in turn to transmit only the identification data of one single device completely. This process is continued until the identification data of all devices have been transmitted completely and without interference. This is determined in the case of the supply device in such a manner that after transmitting the identification data of the last-transmitting device in a time window, no further identification data are received.

Furthermore, it may be noted that the formulation " . . . only then to restart again when the at least one third line is detected as free for the recent dispatches of the identification data." can be realized in various ways. Thus, if the length/duration of the delivery of the identification data with a constant number of symbols is known, it is possible to wait until all symbols of the identification data of one device have been delivered and then automatically begin with the renewed delivery of the identification data. Also, after each delivery of the identification data, it is possible to wait until a delivery command sent out by the supply device is received and only then to begin with the renewed delivery of the identification data.

The transmission of the identification data can, as explained here, take place without further synchronization signals during its duration. This entails relatively complex electronics of the devices, however, because the devices must be operated synchronously with one another at least for the maximum transmission duration which is to be expected. Typically, a relatively expensive quartz resonant circuit (quartz oscillator), which generates a system clock for the respective device, is used for this in each device.

In order to avoid this expensive design of the devices, it may also be provided that the supply device provides a synchronization signal on the at least one third line during the detection of the identification data, to which synchronization signal all of the devices connected to the bus system, which intend to deliver their identification data, orientate. This may be a periodic signal with defined structure, which is received by the devices which are indeed always listening in anyway in the identification mode.

Advantageously, the detection or the delivery of the identification data takes place such that a certain number of bytes (e.g. 6 bytes) is provided or defined therefor. This number of bytes is known to all devices in advance system-wide, that is to say is programmed-in and preferably cannot be changed. The actual transmission of the identification data takes place in the pattern of the clocking by means of the supply device, which sends a start bit (logical symbol "0", power state "low") at the start of the transmission of a byte. The start bit has the function here of a synchronization signal or clock signal, so that the devices can synchronize to it at the start of each delivery of a byte. This measure means that it is possible to dispense with the aforementioned expensive quartz resonant circuits and the devices can be produced extremely inexpensively.

A stop bit may also be involved in this advantageous method for transmitting the identification data, which stop bit is sent by the supply device after the time period, which is reserved for transmission of a byte, has elapsed. This stop bit is defined by the logical symbol "1", power state "high".

As explained previously, the supply device attempts to receive identification data until no more identification data are transmitted. By definition, this situation exists if during the entire reception period, which is provided for the transmission of a byte, no symbol or power state "high" is determined by the supply device. This implies that the identification data of the devices by definition cannot have a byte with the hexadecimal value "FF" ("11111111" in binary representation).

Insofar as embedding of the identification data per byte is provided between a start bit and a stop bit, the synchronization of the devices takes place every 10 bits by means of the start bit. The drift of the electronics can therefore be accepted such that a synchronism of the devices is maintained at least for this time interval.

Of course, it may also be provided that not all of the bytes provided for the transmission of the identification data are used only for the transmission of address data of the devices. Rather, one byte or a plurality of bytes may also be provided for the transmission of status information or the transmission of a multiplicity of individual status flags. Also, data for authenticating the respective device may also already be contained in the identification data.

In the detection mode of the supply device and in the identification mode of the device, both entities are configured for communicating in a low-speed communication process. In this slow communication mode, it may be provided that only a very limited instruction set is available for the supply device, thus e.g. a query command, which all devices understand and after receiving which all devices transmit their identification data as described previously, or else a selection command, using which a single device can be selected, which is also discussed in detail in the following.

In order then to start the process of detecting the identification data, it may be implemented that all devices which are then synchronized by the temporary change of the supply voltage deliver their identification data as explained previously without taking account of the existence of a start or also stop bit.

It may also be provided that following the detection of the temporary change of the supply voltage, all devices remain in a state in which they listen for signals on the at least one third line. In this introductory time interval, that is to say before the identification data are detected, only the supply device has the authorization to use the at least one third line in this variant.

The actual delivery of the identification data can then be started by means of the occurrence of the first start bit.

Also, in the introductory time interval, it is possible to wait for the supply device to send the query command in the said introductory time interval, in order to start the process of detecting the identification data, that is to say also the delivery of the identification data. Thereafter, the actual delivery of the identification data can take place, depending on the implantation, either without embedding into a frame made up of start and stop bit or even with embedding into the frame made up of start and stop bit.

In all embodiments or design variants, the supply device is configured in the detection mode for receiving the identification data in the low-speed communication process, particularly with a symbol rate per second of up to 100 kbauds. In analogy therewith, the device (every device involved in the bus system) is configured in the identification mode for delivering the identification data in the low-speed communication process, particularly with a symbol rate per second of up to 100 kbauds. Therefore, the symbol rate per second which is used is defined in advance and set in a fixed manner, particularly such that it cannot be changed, both for the supply device and for the devices involved in the bus system. Thus, it is achieved that the supply device does not need to know in advance at all which devices are connected to the system bus.

After each device has delivered its identification data, it waits until it receives the selection command from the supply device, with which the supply device selects a single communication partner, by specifying the address of the device to be selected as a constituent of the selection command from the pool of the devices involved in the detection of the identification data, for a further individual communication.

For this purpose, in the detection mode, the supply device is configured to select a single device, from which identification device were detected, in order to remain active further in the bus system. This takes place using the aforementioned selection command, which can be detected by all devices, is also delivered by the supply device at low speed, and comprises an address part of the identification data.

At this point, it may also be mentioned that the identification data may, in addition to the pure address part, also comprise a further information part, which may provide e.g. information about the type of the device or the class of the device, etc. A fixedly predefined number of symbols or bytes must in any case be determined for the detection of the identification data, so that the detection of the identification data can take place as explained, without further synchronization between the communication partners.

In principle, it has proven advantageous that each device comprises a bus system inactivity mode, in which the device assumes bus system inactivity, wherein the device can be supplied electrically with the aid of the first and the second line, but is electronically disconnected from the at least one third line, and the device is designed in such a manner that when there is no communication requirement, the bus inactivity mode is assumed.

The or every device involved is configured in the identification mode, after delivering its identification data, to check whether it is to assume its bus system inactivity or whether it was selected by the supply device and is therefore to remain active further in the bus system. This is to be understood to mean that the device which is assuming its bus system inactivity no longer influences or loads the third line and preferably electronically decouples from this third line. The at least one third line is therefore, after all devices not selected have decoupled from the third line and no longer electronically load or influence the same (capacitively or inductively), available exclusively for the communication between the supply device and the selected device.

The supply device comprises an individual communication mode, in which the supply device is designed for bidirectional communication with a single selected device in a high-speed communication process. In this case, a symbol rate per second of more than 100 kbauds, particularly preferably in the order of magnitude of 1000 kbauds, can be used. The symbol rate used here is in any case higher than in the low-speed communication process.

The supply device is designed, after selection of a single device has taken place, to change from the detection mode to the individual communication mode. Analogously, each device also comprises this individual communication mode, in which the device is configured for individual communication with the supply device in the high-speed communication process, wherein each device is designed, upon established selection, to leave the identification mode and to assume the individual communication mode.

After the communication partners have changed to the individual communication mode, communication, which is adapted to the capabilities and functions of the selected device can take place.

Preferably, both on the part of the supply device and on the part of the device, what is known as a UART (universal asynchronous receiver transmitter), which is implemented there, is activated, with the aid of which the communication between the selected device and the supply device is subsequently handled in the individual communication mode.

Each device is configured to carry out the high-speed communication process according to a device-specific or device-type-specific communication protocol and/or instruction set. Therefore, it is ensured that in contrast to the identification mode, the full spectrum of communication possibilities can be exhausted and also the full range of functions of the device can be activated or used.

In order to use this on the part of the supply device, it is advantageous that the supply device stores a data structure, in which device-specific or device-type-specific communication parameters are stored, and the device is configured, with the assistance of the data structure, to carry out the high-speed communication process with the single selected device according to a device-specific or device-type-specific communication protocol and/or instruction set.

In the data structure, e.g. parameters may be stored, which determine the communication speed individually. Also, information may be stored in the data structure, which contains information about the commands which are available or can be interpreted by the device, as well as the arguments thereof. Seen as a whole, a communication specification for the respective device type can therefore be stored in the data structure.

Thus, e.g. in the case of the realization of the device as an electronic display unit, image data can be transmitted in a data format which is understandable for the display unit and the status of the receipt or the conversion on the screen, etc. can be queried. The same is also true analogously for other devices with different functions, such as sensors or image capture devices, etc.

It may also be implemented that in the case of a first detection of a device, the specification data of which, which specification data are stored in a predefined form that is understandable and consequently also usable for the supply device, are called up from the device and stored in the data structure, in order subsequently to be able to communicate or interact with the device efficiently. Likewise, the specification data may be managed system-wide in a superordinate electronic management instance (e.g. stored on a central management server or in a cloud-based manner) and the specification data are only obtained from this central management instance after detecting the identification data with reference to these identification data and are subsequently stored in the data structure of the supply device.

Furthermore, it has proven exceptionally advantageous that each electronic device comprises a security element, with the aid of which it can be authenticated uniquely with respect to the supply device; it can therefore be authenticated with respect to the supply device. This security element may be formed in a software-based and/or hardware-based manner, such as e.g. using a "security chip" (also termed a "secure element"). A key pair may be used during the authentication. The security element allows an authentication for each device with respect to the supply device, before it is able or allowed to interact with the supply device in a device-specific manner. The term authentication is understood to mean a process which is used for identifying and checking the identity of the relevant device. Only devices which can authenticate at the supply device are permitted for use with the supply device. This may be implemented using methods which are known per se, as are known in the field of "machine to machine communication (M2M)" or the internet of things (IoT), such as for example "X.509 certificates", "Trusted Platform Module (TPM)" or "symmetric key".

For the purpose of authentication, in addition to the address part, an authentication part of data may be contained e.g. in the identification data, which makes it possible for the supply device, which is already in detection mode, to authenticate the relevant device. If the authentication fails, the supply device refuses the selection of the relevant device for the individual communication mode.

For the purpose of authentication, it may however also be provided that the detection of the devices takes place without direct authentication and only thereafter, at the start of the individual communication mode, is the authentication checked, before it is possible actually to communicate in a device-specific manner with an authenticated device. If an authentication of a device is not possible, the supply device refuses further communication with the relevant device and ends the individual communication mode.

Furthermore, with the aid of the superordinate management instance, an authentication of devices which are detected by a supply device is carried out, so that—except for the pure detection of the identification data—such devices must first be approved or permitted by the management instance for use in the bus system, particularly with a certain supply device, which is also shared with the relevant supply device by the management instance, before the supply device is allowed or able to cooperate at all with the relevant device. This may preferably be necessary once, in order to make a device, which is newly accommodated in the system, available for the relevant supply device. The same is true for the case that a device was taken from one supply device to a different supply device.

The supply device may therefore comprise a control, which checks the approval for cooperation with the devices located on its bus system and, only if this approval is present in the sense of the authentication, communicates with the relevant device in a device-specific manner in the high-speed communication process, or possibly even beforehand carries out no selection for this device if the approval does not exist.

The authentication may however also be provided for the supply device, so that only a supply device, which is authenticated with respect to or by the central management instance, can be operated in the system.

The successful authentication can be represented in a device or else in a supply device by an optically discernible status indicator. This may take place e.g. by means of a screen. This visual indication may take place by means of e.g. an LED, which emits a light in the spectral range which is perceivable for the human eye or a light in the spectral range which is outside the spectral range which is perceivable by humans for machine processing.

With the explained authentication, it is possible to ensure that only approved devices can be used in the system or in the bus system. This approval may be present for individual devices. This may however also be present in terms of groups, such as e.g. for device types or device classes, but also specific to producers. Therefore, the use of qualitatively inferior copies of supply devices as well as devices with questionable origin can be stopped in a reliable manner, which contributes considerably to system quality, because this measure is a reliable protection from the inclusion of malware or else prevents the use of non-certified (possibly also non-specification-compliant) hardware. Furthermore, these measures enable a business model which allows the use of a wide range of electronic devices, wherein different device producers can incorporate their specific core competence, but at the same time controls the access of the devices to the system and takes place in line with business as well as strategic interests of the system supplier. The situation is analogous for the supply devices.

The same applies analogously for the external energy storage device (battery pack), which has already been discussed, for supplying the supply device which can also be equipped with the said security element for the aforementioned purposes (identification/authentication).

As soon as an individual communication in the individual communication mode has been ended, which can be shared with the device using a command or may be established automatically from the circumstances of the communication, the device changes its operating mode and enters the bus system inactivity mode.

From then, the entire process including preliminary change of the supply voltage is started anew from the start, if from the standpoint of the supply unit, there is a detection and communication requirement with one of the devices. It may also be provided that, following the preliminary change of the supply voltage, no renewed, complete detection process is run through, but rather one of the devices is selected on the basis of the already detected identification data in the slow communication process, without the other devices having to deliver their identification data anew. After the selection, data can be exchanged with the selected device in the fast communication process.

So that communication between a device and the supply device can be started not only exclusively by the supply device, the devices and the supply device are configured in such a manner that they can also manage without the change of the supply voltage, which introduces the communication, by the supply device. To this end, it is provided on the part of the devices, that the device comprises a connection start mode, in which the device is configured to indicate its requirement to build a connection to the supply device by means of the temporary production of a, preferably high-resistance, loading of the at least one third line of the supply device. Furthermore, following the connection start mode, the device is configured to assume its operating modes, namely the identification mode followed by the individual communication mode, as explained previously.

On the part of the supply device, it is provided that the supply device is designed to detect a temporary substantially high-resistance loading of the one third line by a device which is connected to the bus system, possibly also to differentiate how many connected devices are generating the load at the same time. As a consequence of the detection of the loading, the supply device is configured to assume its operating modes, namely the detection mode followed by the individual communication mode.

Therefore, it is not the entirety of the devices installed on the bus system which are activated, in order to deliver the individual identification data to the supply device. Rather, the supply device is activated by a targeted change of the signal level on the at least one third line which is provided for the signal or data traffic, in order then in the detection mode to request the identification data from the devices loading the at least one third line.

This may relate to the requesting of the identification data from only one single device, in order subsequently to communicate directly (that is to say without the necessity of the selection command) individually with this single device in the high-speed communication process.

As mentioned, the high-resistance loading of the at least one third line may however also come about due to the simultaneous loading of a plurality of devices. In this case, a signal level is set on the at least one third line, which is determined by a voltage divider. The voltage divider is formed by a resistance on the side of the supply device on the one hand and by the parallel circuit, which is connected in series thereto, of the high-resistance resistances of the devices loading the at least one third line. The at least one third line runs between the resistance of the supply device and the parallel circuit of the high-resistance resistances of the devices. The voltage divider is supplied with voltage in the supply device and connected to the reference potential in the devices. Thus, in the supply device, the signal level which is set in accordance with the number of loading devices can be picked up directly on the at least one third line and processed using the analogue/digital converter of the supply device. As the values of the high-resistance resistances, the value of the internal resistance of the supply device and the value of the voltage supplying the voltage divider are known, the microcontroller can precisely calculate how many devices are loading the at least one third line simultaneously. In the detection mode, the identification data for the number of devices previously determined computationally can then be received. However, this calculation may also be omitted and the detection of the identification data may take place as explained previously, without knowledge of the number of the devices.

Subsequently, only one of the detected devices is communicated with individually in a fast manner, following the selection thereof. The other detected devices may remain in a standby state and monitor the at least one third line.

As soon as the individual fast communication with the first selected device is complete, the supply unit can, by leaving the detection mode, change directly to the low-speed communication process and select the next previously detected device and then attend to the device communicatively in the individual communication mode. This may be repeated until all of the previously detected devices which are loading the at least one third line with high resistance have been attended to communicatively.

To round off the general description, an overview of the various components and functions of the system, which has previously been described in detail, may also be given at this point.

The supply device provides the following functions in the system. The supply device can switch off the supply voltage available on the bus system, in order to save energy. This may make sense for example during the night or if a fault has been detected in the bus system. The supply device can change the current limitation in a manner adapted to the respective requirements in the bus system. For the case that there is a requirement in the bus system for a higher voltage or a higher power, if for example an LED is to be activated or an update of a screen is necessary or a camera must be operated, the supply device may also adapt the supply voltage, at least temporarily, to these requirements, in particular increase the supply voltage. The supply device can pull the at least one third line, which is provided for the signal or data transmission, towards the value of the supply voltage with regards to the signal level of the line and, as mentioned, use an analogue/digital converter to detect that one of the devices is pulling or loading this line in the direction of the reference potential with regards to the signal level of the line. This may be used to detect that a device has been newly connected to the bus system and is itself seeking communication with the supply device, in order to be registered by the supply device. However, this may also be used for one of the devices which is already connected to the bus system to trigger an "alert" itself and therefore indicate that it would like to enter into communication with the supply device, wherein details for the reason for the alert can then be transmitted in this communication. The supply device can also execute what is known as a "bus reset", in which the supply voltage available in the bus system is switched off for a short time. This bus reset is to be equated with the temporary change of the supply voltage, which is mentioned in the introduction. As mentioned, it is also designed for communication at low speed (100 kbauds) with "open drain" coupled devices, in order to be able to carry out basic commands, which are understood by all devices, and a detection process for detecting all of the devices available on the bus system. Furthermore, it is also—as mentioned— designed for communication at high speed (approx. 1000 kbauds), wherein the universal asynchronous receiver transmitter (UART) is used in order to be able to transmit to a single device, or receive from the same, larger, but also smaller data quantities fast. In this high-speed communication, (bidirectional) communication is carried out in a device-specific manner. The supply device also monitors the bus system for faults, which are detected for example in that the at least one third line is held for more than 1 ms at the logical level "low".

Each device can enter into a low-energy mode, in which power consumption is as low as possible. For this, it is often sufficient that the microcontroller provided in the device is stopped and, if appropriate, other functional blocks continue to be operated with the supply voltage which is generated locally in the device. In particular, however, it may also be provided that the supply voltage generation, which is provided locally in the device, is switched off completely. This is possible because the supply device provides the function of causing a temporary change of the supply voltage on the bus system. This supply voltage change can be used on the part of the device to switch back on or to start the supply voltage generation which is provided in the device. In principle, the device can be switched on automatically, if for example its main switch is actuated manually, the device is connected to the bus system, the supply unit carries out the bus reset, or a start of the device is initiated with the aid of an optional provided NFC module, with the aid of an external NFC device (integrated into a smartphone or a PDA, etc.). In summary, the device is designed to detect the bus reset and introduce a change of its operating mode, to load the at least one third line weakly in order to indicate its presence or to emit the aforementioned alarm; to carry out the slow "open drain" coupled communication, in order to disclose its identification data, particularly its address; to carry out the fast UART-based communication for the individual data transfer with the supply device; and to decouple or uncouple from the at least one third line, in order to minimize or to avoid its influence during the high-speed communication between the supply device and a different device.

The bus system can represent a wide range of states, which are summarized in the following.

In a "power down" state, the supply voltage is switched off. The at least one third line is pulled to the logical level "high", in order, if appropriate, to make a short circuit or else a loading due to a device detectable.

In a "low power" state, the bus system is supplied with electric power with the aid of a battery. The at least one third line is pulled to the logical level "high", in order, if appropriate, to make a short circuit or else a loading due to a device detectable. Devices, which form a display unit with e-paper screen for example, can have their internal supply voltage switched off. Devices, which comprise a display unit with LCD screen for example, can have their internal microcontroller switched off and only operate the LCD screen using their internal supply voltage. Sensor devices can wake up periodically in order to carry out measurements or to detect physical parameters with the aid of their sensor elements. All these devices can be decoupled from the at least one third line in this case.

In a "presence—or alerting" state, each device can pull the at least one third line to the logical level "low", in order to request communication with the supply device, which may essentially have the meaning of an alarm. Each new device connected to the bus system can indicate its presence by means of a weak loading of the at least one third line. The supply device can enter the detection mode without having to wake up other devices from their idle state.

In a "bus reset" state, the supply device can switch the supply voltage off and on, in order to start the devices. Subsequently, the detection mode can be assumed, in order to detect the identification data, addresses in particular, of the individual devices.

In a "low-speed communication" state, the devices are "open drain" coupled with the at least one third line of the bus system and each device can pull the line to the logical level "low". This mode is introduced by the bus reset. This mode is used for the detection of the devices on the bus system, wherein 48 bits are provided for example for an individual identification of the devices. With the aid of a command, all devices with the exception of a selected device can be uncoupled from the bus system.

In a "high-speed communication" state, a bidirectional communication can take place. In this case, the supply device communicates only with a single selected device, in order for example to transmit image data in the case of a display unit.

A "fault" state exists if the at least one third line is at the logical level "low" for a time interval which lasts longer than may be during a communication; if too high a current consumption is detected; if the at least one third line cannot be pulled to the logical level "low" or "high". As a reaction to the detection of this fault state, the supply device can switch off the supply voltage until the fault is no longer present. For this purpose, the supply device can be configured to check periodically whether the fault is still present or has been eliminated.

A system which comprises the bus system including supply device and at least one device therefore comprises two signalling modes and two communication modes.

In the first signalling mode, the temporary change of the supply voltage is available for introducing a change of an operating mode by means of the supply device.

In the second signalling mode, the (also temporary) high-resistance loading of the at least one third line is available for introducing a change of an operating mode by means of the at least one device.

In the first communication mode, the low-speed communication process is available for selecting a single device, if appropriate also with upstream detection of the devices, and for controlling the devices with a limited instruction set, particularly an instruction set (and/or parameter scope) which is available to all devices and which all devices that are compatible with the bus system understand, by means of the supply device.

In the second communication mode, the high-speed communication process is available for bidirectional communication between the supply device and precisely the one selected device, particularly using a device-specific, individual instruction set or range of functions, which is available for the selected device according to a device type, a device model or a device class or device group to which the device is assigned or individually.

Furthermore, it may be provided that machine-readable, particularly optically readable, marks are located along the shelf edge strip, which marks enable every device fastened to the shelf edge strip to determine its position. The devices can comprise a reading device, particularly an optical reader (e.g. a mini-camera), on their rear side, which is adapted thereto, with the aid of which the marks can be detected, so that the position information provided with the aid of the marks can be processed further by the electronics of the device.

Furthermore, the described system can also be designed for locating electronic devices, the location of which is unknown. In this case, the position of an electronic device situated on the support device (e.g. shelf edge strip) is locally narrowed down by determining the location of the supply device. The determination of the position of the supply device in relation to the access points, the location of which is known, takes place here by using ultra-wideband wireless communication between the access points and the supply device. This measure is associated with the advantage that, in contrast to known measures, the location determination for one but also more electronic devices is no longer dependent on the absolute position of other electronic devices being known, which are used as static anchor points for the position determination in these known measures. Rather, dynamic anchor points, realized by the supply devices, are now used. These can change their position in space over time, for example as a result of repositioning of the shelving unit or else a reorganization of the shelves to which the shelf edge strips are fastened. Therefore, before a location determination for an electronic device takes place, a location determination for the supply device is carried out and—if necessary—on the basis thereof, that is to say, in relation to this position of the supply device, the position of an electronic device is determined or narrowed down. The fact that the electronic device whose position is to be determined or narrowed down is located on the support device on which the relevant supply device is also provided or located ultimately comes into play here. Therefore, as soon as the respective position of the supply device has been determined, the position of the electronic device supplied with the aid of the relevant supply device results de facto automatically, because this electronic device can only be positioned on the relevant support device. In the present context, ultra-wideband wireless communication means radio communication based on ultra-wideband (UWB) technology.

The most important feature is the use of extremely large frequency ranges with a bandwidth of at least 500 MHz or of at least 20% of the arithmetic mean of the lower and upper limit frequencies of the frequency range used. In the method which is discussed here, the determination of the position of the electronic supply device is based on determining the distance between it and each of the involved access points using the respective ultra-wideband wireless communication. A "flight of time" measurement and, where necessary, also an "angle of arrival" determination are used for this. This entails a very precise determination of the location of the respective supply device by the following measures such as e.g. triangulation, etc. To implement this measure, the access points as well as the supply devices merely have to be equipped with UWB radio modules and the detected UWB radio measurement data are transmitted to a central data processing device, where, on the basis of this, the exact positions of the supply devices in space (in the business premises) are determined.

Particularly if the supply device is designed for communicating with an access point according to a standardized communication protocol (e.g. ZigBee®, Bluetooth® Low Energy, WLAN, etc.) and is supplied electrically using the aforementioned battery, it has proven exceptionally advantageous that it comprises a sleep state, in which there is no radio communication readiness for communication with the access point, and comprises an active state, in which there is radio communication readiness with the access point, in order to be operated in an energy-saving manner. In order to ensure the communication availability of the supply device, it has proven advantageous that the access point comprises an additional wake-up transmitter, which is designed to send a wake-up radio signal with addressing information. With the aid of the addressing information, a certain supply device or a group of such supply devices can be addressed. Each of the supply devices additionally comprises an extremely energy-saving wake-up receiver, which is designed to receive the wake-up signal and to check whether the relevant supply device is addressed. If addressing is determined, the supply device is woken up from its sleep state and is then available for the communication with its access point in the standardized communication protocol.

In order to enable operation of an electronic device if it is not electrically supplied directly by the supply device, it has proven advantageous that—in addition to the buffer capacitors or back-up capacitors which are usually provided—the electronic device also comprises a rechargeable long-term energy storage device. This is provided for an at least temporary autonomous operation of the electronics of the electronic device during a time interval in which there is no electrical supply by the supply device. The long-term energy storage device is always charged when the electronic device is electrically connected to the supply device, that is to say when the device is fastened to the support device. Furthermore, it may be implemented that it is agreed between the support device and the relevant electronic device whether the long-term energy storage device actually should or may be charged at the given time or this should take place at a different time, because e.g. the charging of the battery storage device of the support device has currently reached an unfavourably low level. The allowed charging time can likewise be negotiated or agreed. In the electronic device, the long-term energy storage device can e.g. then take over the electrical supply if the electronic device has been removed from the support device and consequently direct supply by the supply device is no longer possible. Thus, even after the detachment of the electronic device from the support device, in the electronic device, image contents of a screen can be changed, image or video captures can be effected, physical parameters can be detected or else in- or outputs can take place in a machine- or else human-understandable manner. According to the preferred embodiment, the long-term energy storage device can be realized by a "supercapacitor", "supercap" for short, also referred to as an "ultracapacitor". Of course, rechargeable batteries can also be used. The advantage of the supercapacitors mentioned lies in the following facts, however. A supercapacitor, also termed an ultracapacitor, is a high-power capacitor with a capacitance that is much higher than in other capacitors, but the capacitor has lower voltage limits and bridges the gap between electrolyte capacitors and rechargeable batteries. It typically stores 10 to 100 times more energy per unit volume or mass than electrolyte capacitors, can receive and release charge much faster than batteries, and tolerates many more charging and discharging cycles than rechargeable batteries.

A further aspect relates to the visually discernible signalling on the support device, which goes beyond that which can take place e.g. using a screen of one of the electronic devices. For this purpose, an electronic device can comprise a light-emitting unit, preferably realized as an LED (as otherwise explained already, also in addition to the screen of the device). The light-emitting devices are then also distributed along the support device in accordance with the positions of the electronic devices. Therefore, light signals can be emitted in a position-specific manner under the control of the individual devices or centrally by means of the supply device. Likewise, the supply device may be equipped with such a light-emitting unit, so that light signals can be emitted at the position of the supply device under the control of the supply device. It may also be provided that the mechanical structure of the support device comprises the light-emitting units at defined, fixed positions and these light-emitting units are electronically connected to the supply device in a detachable manner, so that under control by the supply device, light signals can be emitted at the positions of the light-emitting devices.

These and further aspects of the invention emerge from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
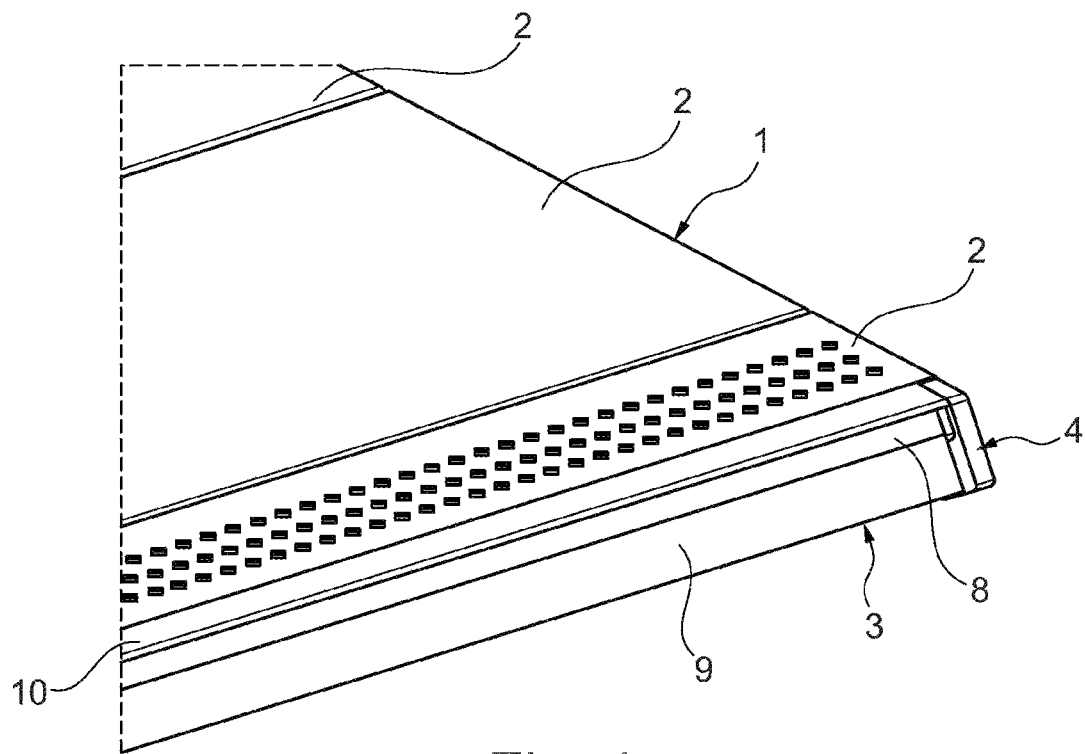
FIG. 1 shows, in a schematic manner, a cutout of a mechanical structure of a shelving unit with a shelf edge strip and a shelf and a supply device attached laterally to the shelf edge strip.

FIG. 1 illustrates a cutout of a shelving unit 1 manufactured from steel, of which one shelf 2 and one shelf edge strip 3 and also an electronic supply device 4, which is inserted laterally into the shelf edge strip 3, can be seen.

Figure 2:
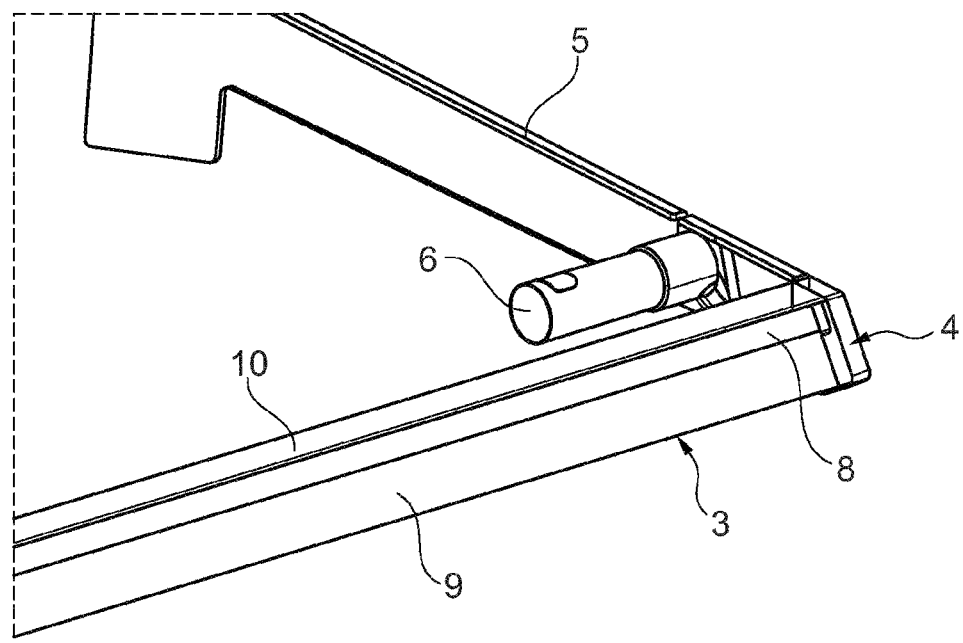
FIG. 2 shows, in a schematic manner, the shelving unit in which the shelf has been removed, so that a battery configuration, which is arranged therebelow, for electrically supplying the supply device is visible.

The said cutout of the shelving unit 1 is illustrated in FIG. 2, wherein the shelf 2 has been removed. Therefore, a lateral support 5 is visible, to which a battery configuration 6 is fastened, which is provided for electrically supplying the supply device 4. The battery configuration 6 is connected to the supply device 4 by a cable 19 (not visible in the present perspective, but indicated in FIG. 8). The battery configuration 6 is fastened to the support 5 with the aid of magnets (not visible here).

Figure 3:
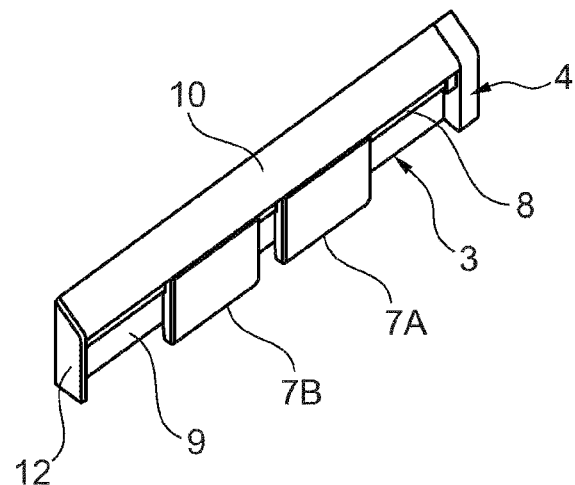
FIG. 3 shows the shelf edge strip with electronic display units inserted on the front thereof, in a schematic manner.

In FIG. 3, the shelf edge strip 3 is illustrated with the supply device 4 and with two devices which are fastened to it, namely electronic display units, that is to say a first display unit 7A and a second display unit 7B, termed electronic shelf labels, abbreviated to ESLs, in the following. The mechanical fastening of the ESLs 7A and 7B takes place here by means of a snap mechanism, which interacts at the rear side of the ESLs 7A and 7B with recesses (not visible in this perspective) which are formed along a reference wall or main wall 9 of the shelf edge strip 3, so that the respective ESL 7A or 7B is pushed upwards against the upper part (termed upper top wall 10 in the following) of the shelf edge strip 3, which grips the ESL 7A or 7B from above, and is held there in a supported manner between the main wall 9 and the top wall 10, which is inclined slightly forwards and downwards. The details of this snap mechanism are not illustrated in the figures, because the focus of this patent application is on the electronic aspects. Therefore, these electronic aspects are discussed in detail in the following.

Figure 4:
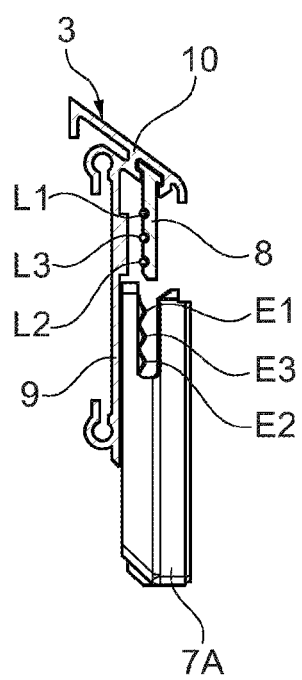
FIG. 4 shows the shelf edge strip with the incompletely inserted display unit, in a schematic manner.
Figure 5:
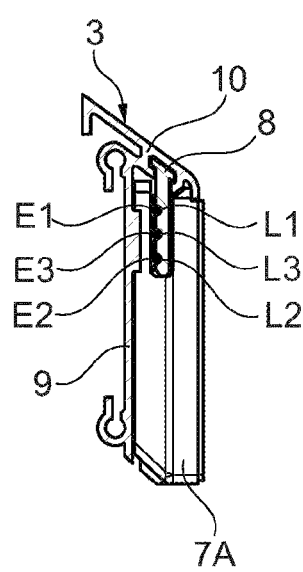
FIG. 5 shows the shelf edge strip with the display unit inserted into it completely, in a schematic manner.

FIGS. 4 and 5 illustrate a section through the shelf edge strips 3 between the ESLs 7A and 7B. Clearly visible here are the structure, manufactured from steel, of the shelf edge strips 3 in a cross section and a conductor support 8 which is inserted into this structure in the upper region thereof. The conductor support 8 is manufactured from plastic and comprises three electrically conductive wires L1, L2 and L3 (for example copper wires) running along the longitudinal extent of the shelf edge strip 3, which wires are inserted without insulation directly into the surface of the conductor support 8 and protrude so high out of the conductor support 8 that they can readily be contacted there along the conductor support 8, essentially along the entire length thereof, using contacts of the ESLs 7A and 7B. The three wires L1 to L3 are positioned on the side of the conductor support 8 which is orientated towards the reference wall or main wall 9 of the shelf edge strip 3, so that the wires are not to be seen from the viewing direction onto the screens of the ESLs 7A and 7B.

Each ESL 7A and 7B comprises a head-side groove, into which the conductor support 8 fits. The ESL 7A or 7B can be pushed from below into the shelf edge strip 3, until it abuts against an upper top wall 10 or the conductor support 8 has reached the deepest point of the groove. For contacting the three lines L1 to L3, each ESL 7A and 7B comprises three contact elements, which in the present case are manufactured by three steel strips, which cannot be seen in detail here. At the end sections E1, E2 and E3 of the steel strips, which end sections of the steel strips protrude out of the housing of the respective ESLs 7A or 7B (see FIG. 4), the steel strips comprise contact zones which are formed in a convex or raised manner. These end sections E1-E3 are mounted in a de facto spring-loaded manner due to the elasticity of the steel strips and contact the lines L1-L3 indicated according to the numbering of the end sections, as soon as the respective ESL 7A or 7B is inserted completely into the shelf edge strip 3, as can be seen in FIG. 5. Here, the elasticity of each steel strip acts resiliently, so that a pressure- or force-loaded contacting of the lines L1 to L3 is ensured. The steel strips are positioned with sufficient space from one another, that is to say such that the steel strips do not touch, and aligned parallel.

For reasons of completeness, it may also be mentioned at this point, that the conductor support 8, the reference wall 9 and also the upper top wall 10 can of course also be seen in FIGS. 1 and 2.

Figure 6:
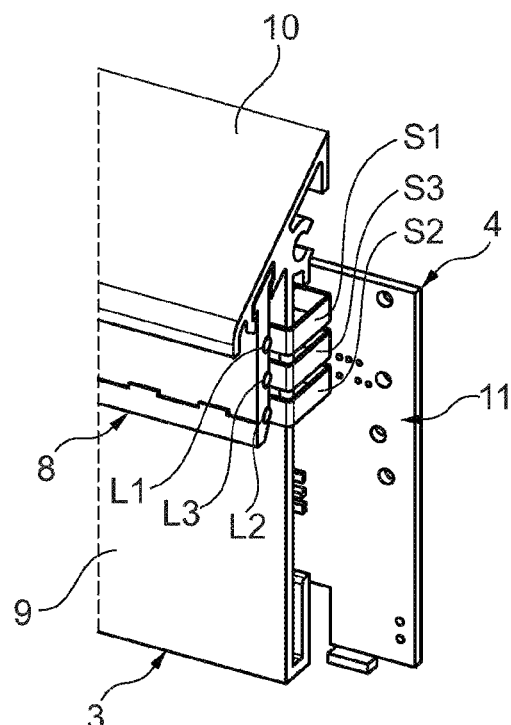
FIG. 6 shows an exposed perspective view of the electrical connection of the supply device to three electrical lines of the shelf edge strip, in a schematic manner.

The electrical coupling of the supply device 4 to the three lines L1-L3 is discussed in the following, wherein reference is made in this context to the FIGS. 6 to 7. In FIG. 6, a housing as well as an antenna of the supply device 4, which is provided for the radio traffic, have been removed, in order to allow the view of a coupling of device electronics 11 of the supply device 4 with the three lines L1-L3. Of the device electronics 11, a printed circuit board and a few electronic components, which are arranged thereon and connected by conductor tracks which are not illustrated, can be seen, but are not discussed in detail. In this view, three steel strips S1, S2 and S3 can be seen, which in each case are connected (e.g. soldered) at a first end region to the electronics 11 and at the other, second end region E4, E5 and E6 thereof comprise a convex, arcuate structure as contact zones. The lines L1 to L3 are contacted using these second end regions E4 to E6. Here also, the elasticity of each steel strip S1-S3 acts resiliently, so that a pressure-loaded contacting of the lines L1 to L3 is ensured. The steel strips S1-S3 are of C- or U-shaped construction and thus encompass the outer end of the reference wall 9 with sufficient spacing, so that this reference wall 9, which is manufactured from steel, is not contacted. Furthermore, the steel strips S1-S3 are positioned with sufficient space from one another, that is to say such that the steel strips do not touch, and aligned parallel to one another.

Figure 7:
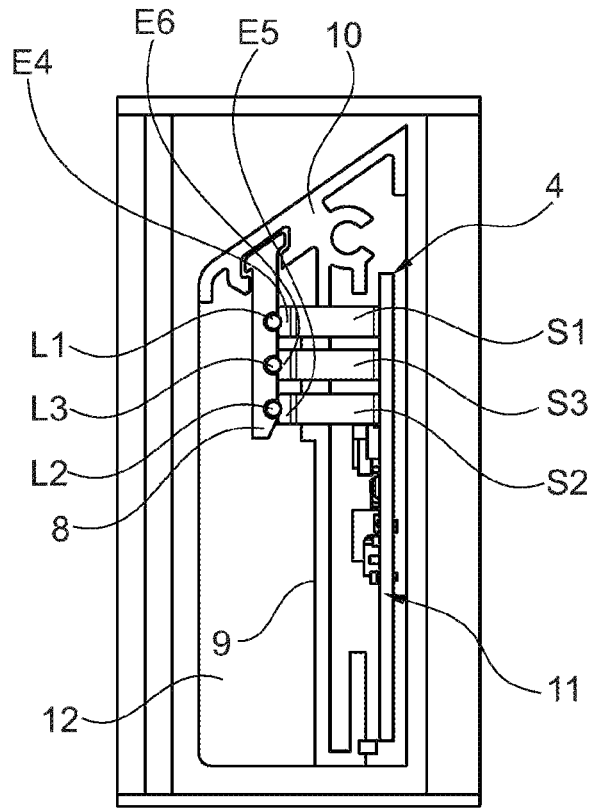
FIG. 7 shows the view according to FIG. 6 with a viewing direction from the right and parallel to the shelf edge strip, in a schematic manner.

It may also be mentioned here that a left-side closing plate 12 of the shelf edge strip 3 can be seen in FIG. 7, as well as already in FIG. 3, which is manufactured from plastic in the present case.

Figure 10:
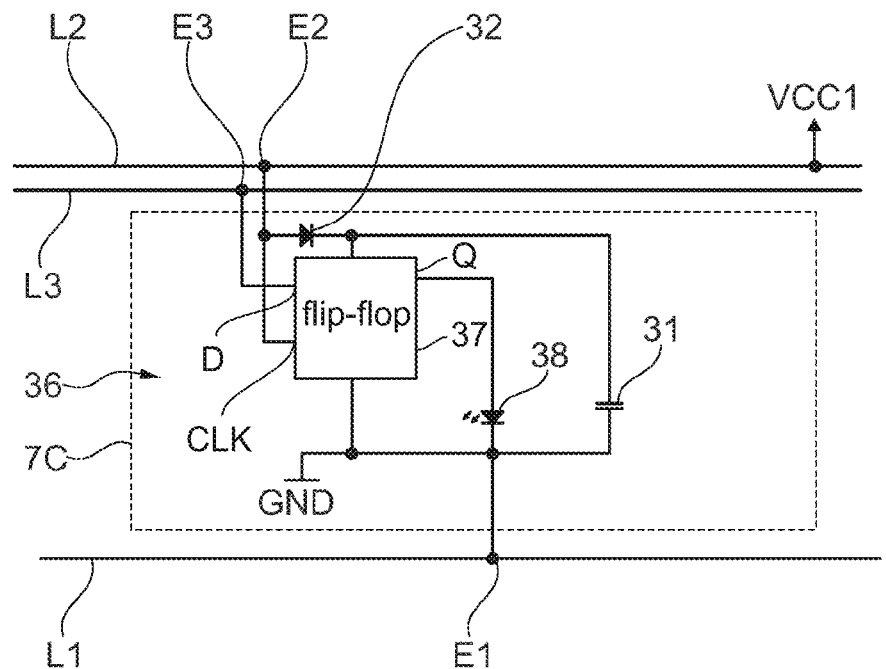
FIG. 10 shows a functionally reduced variant of a device which can be operated using the three lines, in a schematic manner.

The supply device 4 forms, together with the three lines L1 to L3, a bus system of the shelf edge strip 3, to which—as explained in the general description—different devices can be connected, wherein the explanation here is limited only to the ESLs 7A and 7B and a device with greatly reduced functionality, namely what is known as an LED device 7C, which is illustrated in FIG. 10.

Discussed in the following is a block-diagram-like explanation of the device electronics 11, termed the first electronics 11 for short in the following, with the aid of FIG. 8, and of ESL electronics 13, termed the second electronics 13 for short in the following, of ESLs 7A and 7B, with the aid of FIG. 9.

Figure 8:
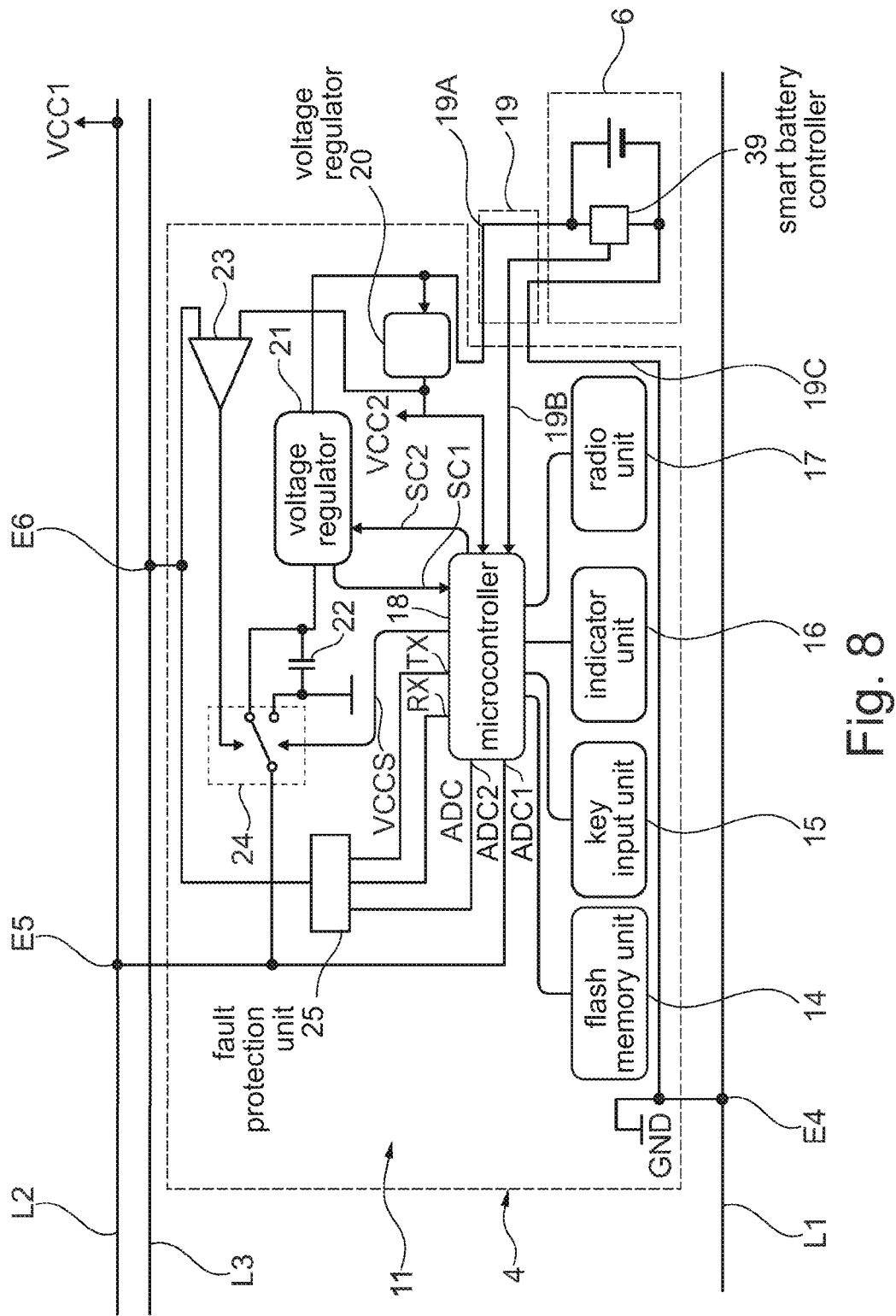
FIG. 8 shows an electronic block diagram of the supply device and the connection thereof to the three lines, in a schematic manner.

In FIG. 8, which shows the block diagram of the first electronics 11, in addition to the three lines L1 to L3, also the end regions E4 to E5 of the steel strips S1 to S3, using which the supply device 4 contacts the lines L1 to L3, are labelled. The first electronics 11 comprise a flash memory unit 14, a key input unit 15, a first indicator unit 16 comprising e.g. an LED, a Bluetooth-low-energy radio unit 17, particularly comprising an antenna (not illustrated) tuned thereto and a central, first microcontroller 18, which provides functionalities or operating modes of the supply device 4 with the aid of software, which is stored in the memory of the microcontroller, as soon as this software is executed, possibly in combination with the circuit peripherals of the microcontroller. The first microcontroller 18 is connected via the peripheral connections thereof to the units 14 to 16, in order to use, activate or else query these units. In connection with the microcontroller 18, mention may be made by way of example of a chip with the designation CSR 1021 from the company Qualcomm Technologies, Inc.

The first electronics 11 are connected via a supply cable 19 to the intelligent, rechargeable battery configuration 6, wherein on the one hand a supply line cable harness 19A for electrical energy supply and a data line cable harness 19B for information transmission are integrated in the supply cable 19. The battery configuration 6 comprises a smart battery controller 39, which provides usage parameters and state parameters of the battery configuration 6 (possibly also authentication information) to the central microcontroller 18, via an I$^2$C bus, which uses the data line cable harness 19B. Likewise contained in the supply cable 19 is a potential line cable harness 19C for determining the reference potential GND.

A first voltage regulator 20 is connected on the input side to the battery configuration 6 and generates an internal supply voltage VCC2 (e.g. approx. 3.3 volts) intended for the operation of the supply device 4. This first voltage regulator 20 can be realized as a "low dropouts" (shortened to LDO) regulator.

The first electronics 11 also comprise a second voltage regulator 21, which is likewise supplied from the battery configuration 6 and is provided on the bus system for providing the bus system supply voltage VCC1 (e.g. approx. 5 volts). An LDO regulator can also be used for this. The second voltage regulator 21 is also connected to the microcontroller 18 (see one line SC1 as input for the microcontroller 18 and one line SC2 as output for the microcontroller 18), in order to query the status thereof or influence the operating behaviour thereof or the operating state thereof. At the output side, a first buffer capacitor 22 is connected to the second voltage regulator 21.

Furthermore, the first electronics 11 comprise an overload detection unit 23 (symbolized by an operational amplifier), which is provided for detecting overloading of the third line L3. Here, a check is essentially carried out that the actual value of the voltage on the third line L3 does not drop below a limit value. So as not to cause undesired switch-offs, this check can take place in a temporal context in particular, that is to say can be carried out at certain times or in certain time intervals and are just not carried out during other times or time intervals, but this is not discussed further in the illustration as a block diagram, which is presented here.

The overload detection unit 23 is connected to a switching stage 24 at the output side, which is designed for switching the value of the supply voltage VCC1 of the bus system between the desired value of the bus system supply voltage VCC1, which is generated by the second voltage regulator, and the reference potential GND. If overloading is detected, the second line L2 is therefore connected by the switching stage 24 to the reference potential GND.

Furthermore, the first analogue/digital converter input ADC1, abbreviated ADC input ADC1, of the first microcontroller 18 is connected to the second line L2, in order to be able to detect the signal level on this line L2.

A fault protection unit 25 is provided between a serial transmission output TX and a serial receiving input RX of the microcontroller 18 on one side and the third line L3 on the other side, so that these connections TX and RX of the microcontroller 18 are protected from incompatible signal situations. The fault protection unit 25 is furthermore configured such that the fault protection unit enables the first microcontroller 18 to detect the signal states or signal levels on the third line L3 with the aid of the second ADC input ADC2 of the microcontroller, which is necessary for the detection of the weak (high-resistance) loading of the third line L3, which was explained extensively in the general description, by one of the devices 7A or 7B.

The first microcontroller 18 is furthermore connected to the switching stage 24, in order to activate the switching stage with the aid of a VCC control signal VCCS, in order to bring about the temporary change of the supply voltage VCC1, which is explained extensively in the general description, which is realized in the present circuit design by means of a temporary switch-off of the bus system supply voltage VCC1.

Furthermore, it may be mentioned that the wiring connection to the third line L3 can take place such that initially a protective circuit is provided, which protects the first electronics 11 from overvoltage and from electrostatic discharge. Furthermore, a variable bus pull-up circuit may be provided, which pulls the signal level of the third line L3 more strongly or more weakly (that is to say with lower or higher resistance) in the direction of the internal supply voltage VCC2, depending on the requirement or operating mode. The bus pull-up circuit can be controlled by the first microcontroller 18 and acts between the protective circuit and the communication terminals TX, RX of the first microcontroller 18. The stronger pulling of the signal level towards the internal supply voltage VCC2 can be realized by a resistance with a value in the order of magnitude of e.g. 5 kiloohms and is used e.g. during the low-speed communication process.

Figure 9:
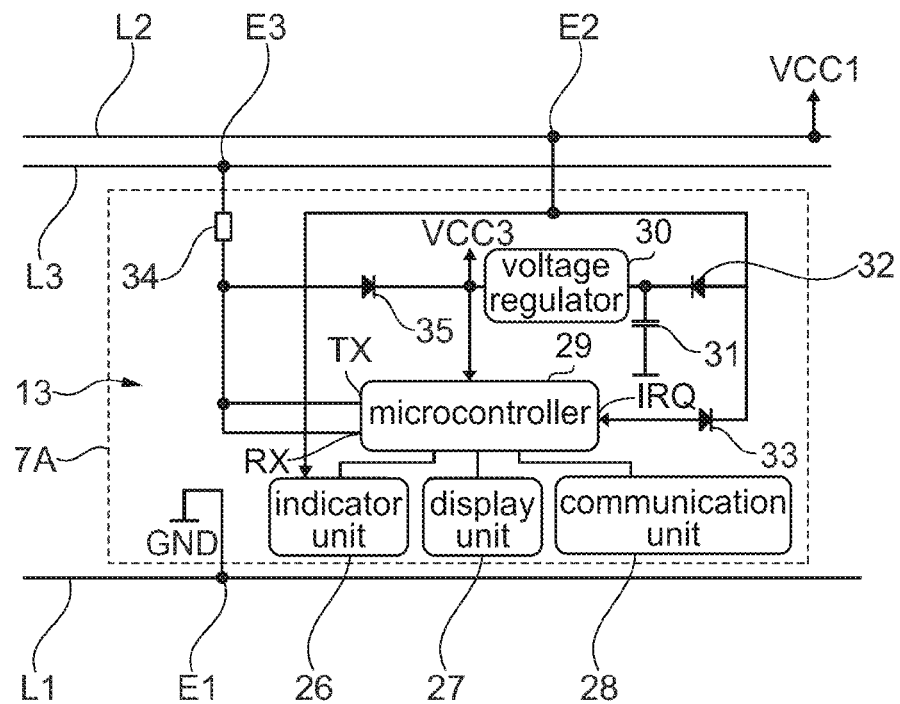
FIG. 9 shows an electronic block diagram of an electronic display unit and its connection to the three lines, in a schematic manner.

In FIG. 9, which shows the second electronics 13, in addition to the three lines L1 to L3, the end regions E1 to E3 of the steel strips, using which the ESL 7A or 7B contacts the lines L1 to L3, are also illustrated. The second electronics 13 comprise a second indicator unit 26 with e.g. an LED, an e-paper display unit 27, an NFC communication unit 28 and a central, second microcontroller 29, which provides functionalities or operating modes of the supply device 4, which were discussed in detail in the general description, with the aid of software, which is stored in the memory of the microcontroller, as soon as this software is executed, possibly in combination with the circuit peripherals of the microcontroller. The second microcontroller 29 is connected via the peripheral connections thereof to the units 26 to 28, in order to use, activate or else query these units. In connection with the second microcontroller 29, mention may be made by way of example of a chip with the designation EFM32™ Pearl Gecko 32 bit microcontroller from the company Silicon Labs.

The second electronics 13 comprise a third voltage regulator 30, which is connected to the second line L2 and which generates an internal supply voltage VCC3 (e.g. approx. 3.3 volts) intended for the operation of the ESL 7A or 7B. This third voltage regulator 30 may also be designed as an LDO regulator. At the input side, a second buffer capacitor 31 and a first diode 32 are provided, forward biased towards the third voltage regulator 30. The second buffer capacitor 31 ensures the operation of the third voltage regulator 30 at times in which the temporary change of the bus system supply voltage VCC1 occurs. During such time intervals, the first diode 32 also ensures that the second buffer capacitor 31 cannot discharge in the direction of the second line L2. The capacitance of the second buffer capacitor 31 is designed with sufficient reliability for the time interval to be bridged at the known (maximum) power requirement of the second electronics 13.

Furthermore, an interrupt input IRQ of the second microcontroller 29 is connected to the second line L2 via a second diode 33, which is forward biased from the interrupt input IRQ towards the second line L2. Therefore, if the temporary change of the value of the bus system supply voltage VCC1 exists, which is manifested by a short-term (approx. 100 microsecond) application of the reference potential GND on the second line L2, an interrupt is triggered at the second microcontroller 29, which leads to a change of the current operating mode to an identification mode, wherein the identification mode has been explained in detail in the general description. In the microcontroller 29, the occurrence of the interrupt causes the execution of a software provided therefor, with the aid of which the identification mode is provided.

A serial transmission output TX and a serial receiving input RX of the microcontroller 29 are connected to the third line L3 via a high-resistance resistor 34 (approx. 100 kiloohms). Therefore, the high-resistance loading of the third line L3 explained in detail in the general description can be effected in the connection start mode. This high-resistance loading establishes a signal level on the third line L3, which is typical but dependent on the number of loading devices and which is detected and evaluated by the first microcontroller 18 with the aid of the second ADC input ADC2 of the first microcontroller. This signal level is preferably conceived such that the signal level differs from the signal levels which typically occur in connection with logical states—particularly during digital data communication.

A second diode 35, which connects the high-resistance resistor 34 to the output of the third voltage regulator 30 with forward bias in the direction of the third voltage regulator 30, protects the third voltage regulator 30 during a short circuit, because the second diode is reverse biased when the short circuit occurs. Furthermore, the second diode protects the third voltage regulator 30 in combination with the resistor 34 in the event of an overvoltage on the third line L3, because the resistor 34 acts in a current-limiting manner.

Furthermore, it may be mentioned that the wiring connection to the third line L3 can take place such that initially a protective circuit is provided, which protects the second electronics 13 from overvoltage and from electrostatic discharge. A coupling circuit for bus switch-on or switch-off can be connected thereto, which allows the second electronics 13 to electrically couple to the third line L3 or to disconnect from the same under the control of the second microcontroller 29. Instead of complete disconnection, a relatively high-resistance connection may also be retained here. Furthermore, a variable bus pull-down circuit may be provided, which pulls the signal level of the third line L3 more strongly or more weakly (low-resistance or high-resistance) in the direction of the reference potential, depending on the requirement or operating mode. The variable bus pull-down circuit can be controlled by the second microcontroller 29 and connected between the protective circuit and coupling circuit. The weak loading can be realized by a resistor with a value in the order of magnitude of e.g. 100 kiloohms up to 1 megaohm and is used e.g. during the low-speed communication process. Furthermore, a soft-start circuit may be provided, which ensures that no short circuit between the first line L1 and the second line L2 is caused when the device (e.g. ESL) is inserted into the shelf edge strip 3. The soft-start circuit limits the initial current consumption during insertion into the shelf edge strip 3, because the internal capacitors are still discharged at this time.

Furthermore, a relatively simple LED device 7C is illustrated and discussed in FIG. 10, which comprises third electronics 36. The LED device is essentially formed by a bistable flip-flop 37, which comprises a light-emitting diode 38 connected at the output Q of the flip-flop. Here also, the combination of the first diode 32 and the buffer capacitor 31 ensures the bridging of the time interval of the temporary change of the bus system supply voltage VCC1. This LED device 7C adapts a logical state of the output Q to the logical state—respectively present at the time of the change of the bus system supply voltage VCC1—of the third line L3, which is connected to the data input D of the flip-flop 37. In this case, the temporary change of the bus system supply voltage VCC1, which is supplied to the flip-flop 37 at the clock-pulse input (also termed clock input) CLK thereof, acts as a clock pulse for the assumption of the state. This LED device 7C cannot be addressed explicitly. The LED device also provides no identification data.

Figure 11:
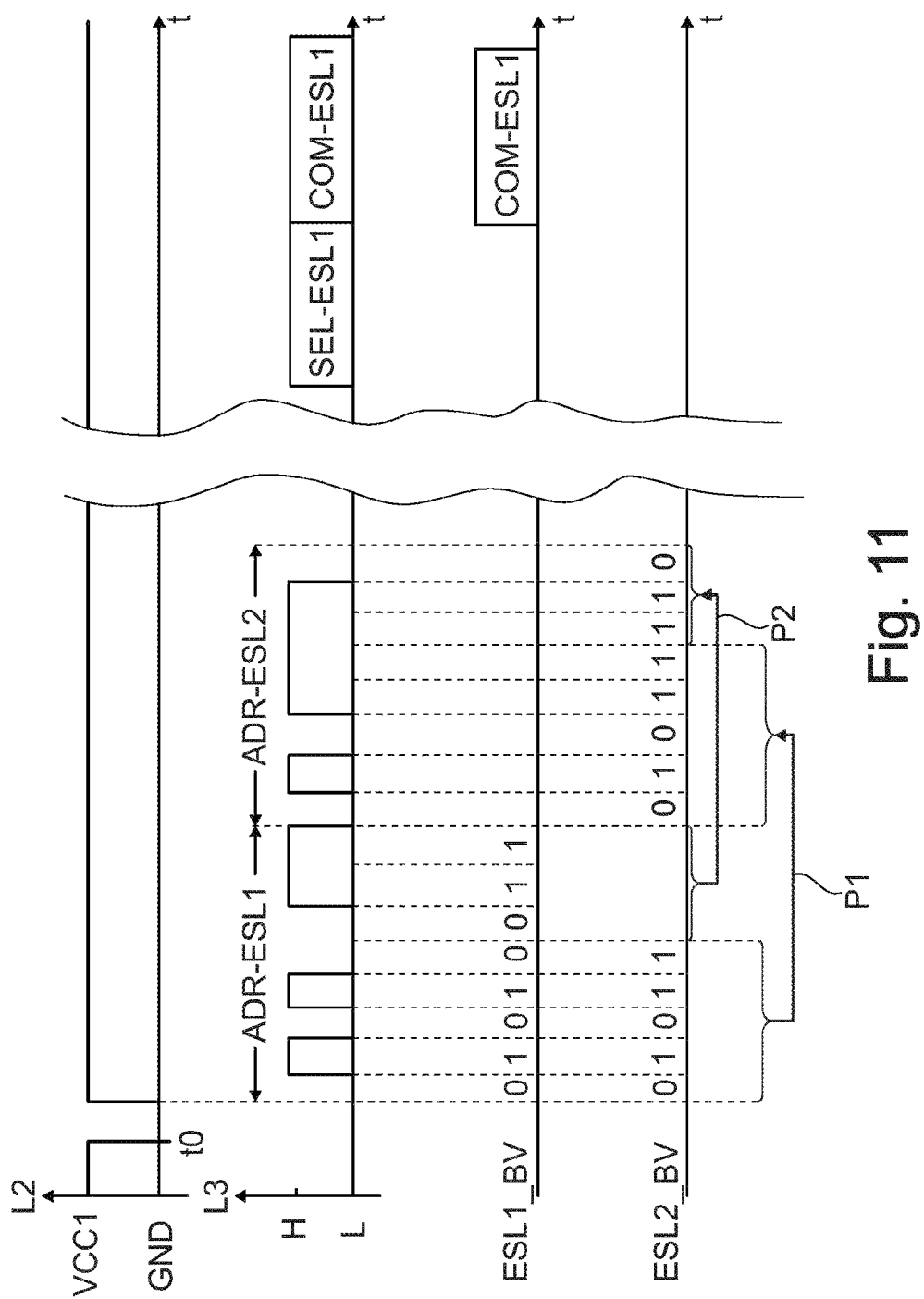
FIG. 11 shows a temporal sequence of signal states occurring on the lines of the shelf edge strip in the course of a communication between the supply device and the electronic devices according to a first exemplary embodiment, in a schematic manner.

The interaction of the supply device 4 with the two ESLs 7A and 7B on the bus system is explained according to a first exemplary embodiment with the aid of FIG. 11.

FIG. 11 shows four time-synchronous diagrams, which are arranged above one another. The uppermost diagram shows the curve of the bus system supply voltage VCC1 over time t. Counted from the top downwards, the second diagram shows signal states on the third line L3. Counted from the top downwards, the third diagram shows logical symbols ESL1_BV, which the first ESL 7A outputs to the third line L3. The lowermost, fourth diagram shows logical symbols ESL2_BV, which the second ESL 7B outputs to the third line L3.

Initially, it may be assumed that the ESLs 7A and 7B are in an idle or sleep state with a lowest possible current consumption.

Starting with the time t0, the supply device 4 causes a temporary change of the bus system supply voltage VCC1 for approx. 100 microseconds, wherein during this time interval, the value deviates from the desired value of 5 volts and is actually set to the reference potential (GND, 0 volt). At the latest with the end of the time interval, the supply device 4 has assumed its detection mode. This change of the bus system supply voltage VCC1 triggers the interrupt at the second microcontroller 29 of the ESLs 7A and 7B, so that the microcontrollers enter into the identification mode and begin in the low-speed communication process, with open-drain connection to the third line L3, to deliver the identification data of the microcontrollers as address data ADR-ESL1 and ADR-ESL2 simultaneously. As can be seen from the comparison of the logical symbols of the third and the fourth diagram, both ESLs 7A and 7B can thus specify the first five logical symbols of the address data ADR-ESL1 and ADR-ESL2 of the ESLs, because the ESLs determine by monitoring the third line L3, that the temporal sequence of the signal states occurring there matches the temporal sequence of the logical symbols ESL1-BV and ESL2_BV specified by the ESLs in each case. The respective logical symbols ESL1_BV and ESL2_BV are therefore identical up to the fifth logical symbol. However, from the sixth logical symbol, the second ESL 7B stops sending, because the second ESL determines by monitoring the third line L3, that the third line has a symbol different to its own, namely a symbol (actually "0" or "low") of the other ESL 7A, which is dominant in the case of open-drain connection. Only after the delivery of the address data ADR-ESL1 by the first ESL 7A has been completed, does the second ESL 7B begin to transmit the address data ADR-ESL2 of the second ESL anew, this time successfully without interference. The process of the delayed renewed transmission of the entire address data ADR-ESL2 of the second ESL 7B is indicated by the two arrows P1 and P2.

Subsequently, one of the ESLs 7A or 7B, in the present case the first ESL 7A, is selected in the low-speed communication process by the supply device 4 with the aid of a selection command, that is to say is addressed, which is visualized in the second diagram in a selection sequence SEL-ESL1, and changes to the individual communication mode.

The second ESL 7B changes back to bus inactivity or the idle-state mode of the second ESL, in which the second ESL is decoupled from the third line L3, in order not to disturb high-speed communication processes.

The first ESL 7A then communicates, with the aid of a UART, with the supply device 4 bidirectionally in the high-speed communication process, which is indicated in the second and third diagram by a communication sequence COM-ESL1, wherein in the present case, e.g. image data are transmitted to the ESL 7A and the receipt or the internal processing is acknowledged.

Subsequently, the first ESL 7A also changes back to the idle-state mode.

To avoid misunderstandings, it may also be mentioned that in contrast to the sequences, in which the address data ADR-ESL1 and ADR-ESL2 are visualized in detail with regards to the logical symbols thereof, in the visualization of the sequences SEL-ESL1 and COM-ESL1, the logical symbols transmitted within these sequences and occurring on the third line L3 are not discussed further individually.

As mentioned, one of the ESLs 7A or 7B or else both together can itself/themselves load the third line L3 at high resistance, in order to signal a communication requirement with the supply device 4. In this case, the supply device 4 changes from the idle-state mode of the supply device, leaving out the initial temporary change of the bus system supply voltage VCC1, directly to the detection mode, in which—as visualized in FIG. 11—the address data of one or more ESLs 7A or 7B are detected and subsequently a targeted communication with only one selected ESL 7A or 7B is carried out in the high-speed communication process. Here, this may be the status report of the ESL 7A or 7B for a task which has been performed in the background or an input of a user via an input unit of the ESL 7A or 7B or an interaction with an NFC device on the ESL 7A or 7B, etc. All of these events can wake a device which is connected to the bus system from the idle-state mode of the device and trigger a communication requirement with the supply device 4, to which the ESL 7A or 7B reacts in the manner explained.

Figure 12A:
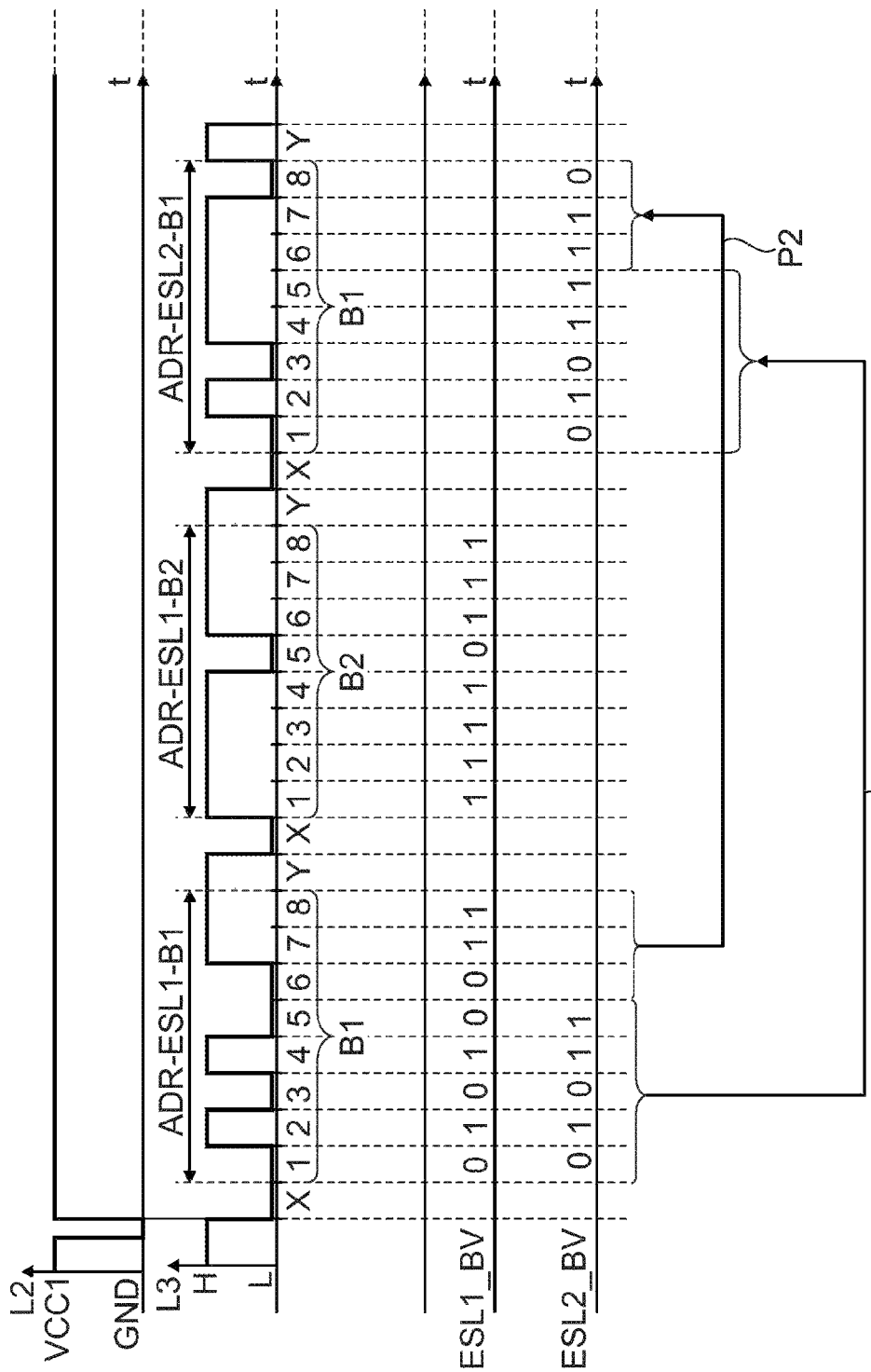
FIG. 12A-12B shows a further temporal sequence of the signal states occurring on the lines of the shelf edge strip according to a second exemplary embodiment, in a schematic manner.
Figure 12B:
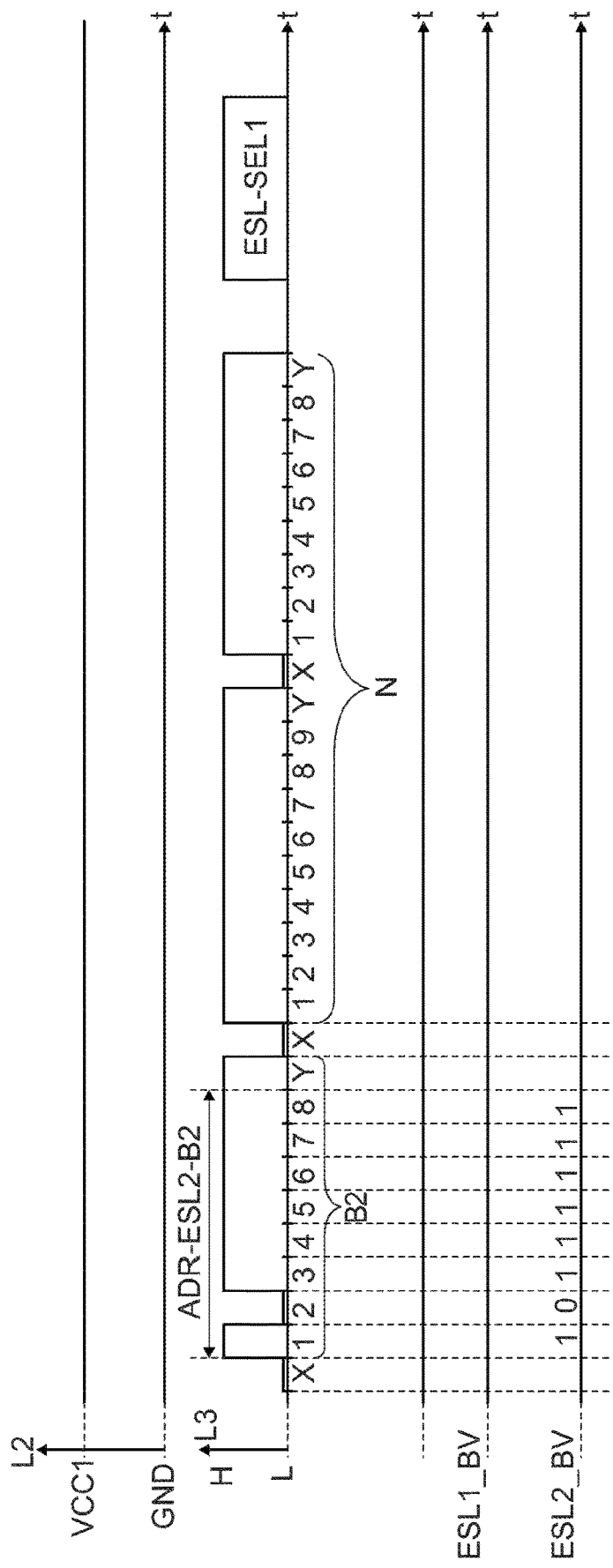

In FIGS. 12A and 12B, which show temporally continuous signal states divided onto two figure pages, the interaction of the supply device 4 with the two ESLs 7A and 7B on the bus system is explained according to a second exemplary embodiment. In this exemplary embodiment, a start bit X, here with the logical value "0" or signal state "low", is delivered by the supply device 4 on the third line L3 as an introduction to the sending of each byte of the identification data. This is the trigger for the ESLs 7A and 7B to deliver the bits of the ESLs of the first byte of the identification data according to the procedure according to the first exemplary embodiment, but after the fifth bit of the first byte, to end the delivery by the second ESL 7B for the reasons mentioned in connection with FIG. 11. The byte-by-byte delivery is ended by the supply device 4, which outputs a stop bit Y, here with the logical value "1" or signal state "high", on the third line L3.

This sequence of introductory start bit X by the supply device 4, which acts as a synchronization signal or clock pulse for all ESLs 7A and 7B connected to the bus system, and subsequent byte-by-byte delivery of the identification data by at least one of the ESLs 7A or 7B with final stop bit Y after each byte can be repeated according to a previously defined or specified number of bytes (here for a clearer explanation, two sections, which are labelled as first byte B1 and second byte B2 of the respective address-part bytes ADR-ESL1-B1 and ADR-ESL1-B2 for the first ESL 7A as well as ADR-ESL2-B1 and ADR-ESL2-B2 for the second ESL 7B), until one of the devices (here the first ESL 7A) has specified the complete identification data thereof. Subsequently, this process is repeated for the detection of further identification data of a different device (here for the second ESL 7B) and in principle repeated until all of the devices connected to the bus system (here, this is the first ESL 7A and the second ESL 7B) have delivered the identification data thereof.

In this case, it is conventionally forbidden that the identification data are only formed by bits with the logical value "1" or signal state "high", because the supply device 4 detects the completion of the detection of the identification data, because during a period of the in the present case two bytes, no signal state deviating from the logical value "1" or signal state "high" could be determined between the respective start bit X and stop bit Y. This is illustrated in FIG. 12B in the sequence N. This means that up to and including the last device (here the second device ESL 7B) all devices (here the first and the second ESL 7A and 7B) have already delivered the identification data thereof in the preceding detection cycle.

Thus, the detection of the identification data ends and the supply device 4 selects one of the devices 7A or 7B per selection command by specifying the relevant device address, which is marked analogously to FIG. 11 as the temporally last entry in FIG. 12B by ESL-SEL1. As explained previously in connection with FIG. 11, the supply device 4 and the selected device (e.g. the first device 7A) change to the individual communication mode, whereas the other device 7B resumes its bus system inactivity or changes to the idle-state mode. After individual communication has taken place, the first ESL 7A also releases the third line L3 and changes to the idle-state mode.

Finally, it is once more pointed out that the figures previously described in detail are only concerned with exemplary embodiments, which can be modified in many different ways by a person skilled in the art, without departing from the scope of the invention. For the sake of completeness, it is also pointed out that the use of the indefinite article "a" or "an" does not mean that the relevant features cannot also be present multiple times.

The invention claimed is:

1. A shelf edge strip, comprising:
   a main wall;
   a conductor support including a surface facing the main wall; and
   a bus system, which comprises:
   a first line for determining an electric reference potential,
   a second line for providing a supply voltage with a desired value in relation to the reference potential,
   at least one third line for communication of signals and/or data,
   a supply device, which is electrically conductively connected to the first line, the second line, and the third line, and is designed for electric power supply as well as for communication supply of electronic devices which can be connected to the bus system,
   wherein the supply device is designed to supply different device types both with electric power and, following identification of the device type, with communication in a device-type-specific manner, and
   wherein the first line, the second line, and the third line are positioned on the surface facing the main wall, protrude from the surface facing the main wall, and are exposed between the main wall and the surface facing the main wall.

2. The shelf edge strip according to claim 1, wherein the supply device is designed for a temporary change of the supply voltage, in order to introduce a change of an operating mode.

3. The shelf edge strip according to claim 2, wherein the supply device is designed to change the supply voltage in accordance with a predefined signal shape.

4. The shelf edge strip according to claim 3, wherein the predefined first signal shape of the supply voltage is defined by at least one parameter of the group listed below, namely:
   a) a falling edge,
   b) a rising edge,
   c) a voltage value which is present during a time interval and which differs from the desired value of the supply voltage.

5. The shelf edge strip according to claim 3, wherein the predefined signal shape of the supply voltage is defined by at least one parameter of the group listed below, namely:
   a) a falling edge having a predefined curve with a value of a slope of the falling edge within a defined value range,
   b) a rising edge having a predefined curve with a value of a slope of the rising edge within a defined value range,
   c) a voltage value which is present during a time interval and which differs from the desired value of the supply voltage, the voltage value having a lower value than the value of the supply voltage, the lower value corresponding to a digital low state.

6. The shelf edge strip according to claim 3, wherein the predefined signal shape of the supply voltage is defined by at least one parameter of the group listed below, namely:
   a) a falling edge having a predefined curve with a value of a slope of the falling edge within a defined value range and having a predefined voltage value difference,
   b) a rising edge having a predefined curve with a value of a slope of the rising edge within a defined value range and having a predefined voltage value difference,
   c) a voltage value which is present during a time interval and which differs from the desired value of the supply voltage, the voltage value having a lower value than the value of the supply voltage, the lower value corresponding to a digital low state and corresponding to the reference potential.

7. The shelf edge strip according to claim 2, wherein the duration between the start of the temporary change and a restoration of the supply voltage with the desired value with respect to the reference potential of the supply voltage, lasts less than 500 µs.

8. The shelf edge strip according to claim 2, wherein for the purpose of changing the supply voltage, the supply device is configured in such a manner that the supply device comprises:
   a voltage generating stage, which is designed for generating the supply voltage with the desired value and for delivering the supply voltage at its output,
   a switching stage, which can be activated by means of a control signal and which is designed, depending on the control signal, alternately either to connect the second line to the first line or the second line to the output of the voltage generating stage,
   a microcontroller, one of the outputs of which is connected to the switching stage and which is configured for delivering the control signal to the switching stage.

9. The shelf edge strip according to claim 2, wherein the duration between the start of the temporary change and the restoration of the supply voltage with the desired value with respect to the reference potential of the supply voltage, lasts less than 250 µs.

10. The shelf edge strip according to claim 2, wherein the duration between the start of the temporary change and the restoration of the supply voltage with the desired value with respect to the reference potential of the supply voltage, lasts in the order of magnitude of 100 µs.

11. The shelf edge strip according to claim 1, wherein the supply device comprises a detection mode, in which the supply device is designed for detecting identification data, which uniquely identify an electronic device which is connected to the bus system, of one or more electronic devices which are connected to the first line, the second line, and third line, and the supply device is designed to assume the detection mode for the purpose of introducing a change of an operating mode of the supply device.

12. The shelf edge strip according to claim 11, wherein the supply device is configured to remain in the detection mode and to receive identification data until no further identification data are received.

13. The shelf edge strip according to claim 11, wherein the supply device is configured in the detection mode for receiving the identification data in a low-speed communication process, with a symbol rate per second of up to 100 kbauds.

14. The shelf edge strip according to claim 11, wherein in the detection mode, the supply device is configured to select a single device, from which identification device were detected, in order to remain active further in the bus system.

15. The shelf edge strip according to claim 11, wherein the supply device comprises an individual communication mode, in which the supply device is configured for bidirectional communication with a single selected device in a high-speed communication process, and the supply device is designed, after selection of a single device has taken place, to change from the detection mode to the individual communication mode.

16. The shelf edge strip according to claim 15, wherein the supply device stores a data structure, in which device-specific or device-type-specific parameters are stored, and the supply device is configured, with the assistance of the data structure, to carry out the high-speed communication process with the single selected device according to a device-specific or device-type-specific communication protocol and/or instruction set.

17. The shelf edge strip according to claim 1, wherein the at least one third line is a single third line.

18. The shelf edge strip according to claim 1, wherein the supply device comprises an individual communication mode, in which the supply device is configured for bidirectional communication with a single selected device in a high-speed communication process, with a symbol rate per second of more than 100 kbauds, and the supply device is designed, after selection of a single device has taken place, to change from the detection mode to the individual communication mode.

19. The shelf edge strip according to claim 1, wherein the supply device comprises an individual communication mode, in which the supply device is configured for bidirectional communication with a single selected device in a high-speed communication process, with a symbol rate per second in the order of magnitude of 1000 kbauds, and the supply device is designed, after selection of a single device has taken place, to change from the detection mode to the individual communication mode.

20. A system comprising:
a shelf edge strip comprising a main wall, a conductor support including a surface facing the main wall, and a bus system; and
an electronic device comprising a bus interface, which is designed for connection to lines of the bus system, wherein
the bus system comprises:
a first line for determining an electric reference potential,
a second line for providing a supply voltage in relation to the reference potential,
at least one third line for communication of signals and/or data,
a supply device, which is electrically conductively connected to the first line, the second line, and the third line, and is designed for electric power supply as well as for communication supply of other electronic devices which can be connected to the bus system,
wherein the electronic device is designed for the identification of the electronic device with respect to the supply device for the purpose of subsequent device-type-specific communication with the supply device, and
wherein the first line, the second line, and the third line are positioned on the surface facing the main wall, protrude from the surface facing the main wall, and are exposed between the main wall and the surface facing the main wall.

21. The system device according to claim 20,
wherein the electronic device comprises a detection stage, which is designed for detecting a temporary change of the supply voltage, and wherein
the electronic device is designed to change its operating mode in the event of such a detection.

22. The system device according to claim 20, wherein
the electronic device comprises identification data, which are used for the unique identification of the electronic device, and wherein
the electronic device comprises an identification mode, in which the electronic device is configured for delivering the identification data via the at least one third line, and wherein
the electronic device is designed for assuming the identification mode for the purpose of changing an operating mode of the device.

23. The system according to claim 22, wherein the electronic device in the identification mode is configured to check, at the same time as the delivery of the identification data, whether a signal sequence occurring on the at least one third line corresponds to a sequence of logical states, by means of which the identification data are defined, and as soon as a deviation between a current signal state of the at least one third line and the current logical state occurs, to abort the delivery of the identification data and only then to restart again when the at least one third line is detected as free for the renewed dispatches of the identification data.

24. The system according to claim 22, wherein the device is configured in the identification mode to deliver the identification data in a low-speed communication process with a symbol rate per second of up to 100 kbauds.

25. The system according to claim 22, wherein the device is configured in the identification mode, after delivering its identification data, to check whether it is to assume its bus system inactivity or whether it was selected by the supply device in order to remain active further in the bus system.

26. The system according to claim 22, which comprises an individual communication mode, in which the device is configured for individual communication with the supply device, wherein the device is designed, upon established selection, to leave the identification mode and to assume the individual communication mode.

27. The system according to claim 20, wherein the at least one third line is a single third line.

* * * * *